United States Patent
Yang

(10) Patent No.: US 12,008,791 B2
(45) Date of Patent: Jun. 11, 2024

(54) IMAGE DATA COMPRESSION

(71) Applicant: Imagination Technologies Limited, Kings Langley (GB)

(72) Inventor: Xile Yang, Rickmansworth (GB)

(73) Assignee: Imagination Technologies Limited, Kings Langley (GB)

( * ) Notice: Subject to any disclaimer, the term of this patent is extended or adjusted under 35 U.S.C. 154(b) by 413 days.

(21) Appl. No.: 17/213,628

(22) Filed: Mar. 26, 2021

(65) Prior Publication Data

US 2021/0304446 A1    Sep. 30, 2021

(30) Foreign Application Priority Data

Mar. 26, 2020  (GB) ...................... 2004420

(51) Int. Cl.
  *G06T 9/00* (2006.01)
  *H04N 19/182* (2014.01)
  *H04N 19/50* (2014.01)

(52) U.S. Cl.
  CPC .............. *G06T 9/005* (2013.01); *G06T 9/004* (2013.01); *H04N 19/182* (2014.11); *H04N 19/50* (2014.11)

(58) Field of Classification Search
  CPC .................. G06T 9/00–40; H04N 19/00–99
  See application file for complete search history.

(56) References Cited

U.S. PATENT DOCUMENTS 5,150,208 A * 9/1992 Otaka ................. H03M 7/3053
                                                        348/420.1
5,295,077 A * 3/1994 Fukuoka ................ H04N 19/14
                                                        706/900

(Continued)

FOREIGN PATENT DOCUMENTS

| JP | 10275274 A | 3/1990 |
|---|---|---|
| WO | 9827736 A2 | 6/1998 |
| WO | 2015/016860 A1 | 2/2015 |

OTHER PUBLICATIONS

Lan et al; "Compress Compound Images in H.264/MPGE-4 AVC by Exploiting Spatial Correlation"; IEEE Transaction on Image Processing, vol. 19; No. 4; Apr. 2010; pp. 946-957.

(Continued)

*Primary Examiner* — Sean T Motsinger
(74) *Attorney, Agent, or Firm* — Potomac Law Group, PLLC; Vincent M DeLuca

(57) ABSTRACT

A computer-implemented method and a compression unit for performing lossy compression on a block of image data in accordance with a multi-level difference table. The block of image data comprises a plurality of image element values, wherein each level of the multi-level difference table comprises a plurality of entries. An origin value for the block of image data is determined. A level within the multi-level difference table for the block of image data is determined. For each image element value in the block of image data, one of the entries at the determined level within the multi-level difference table is selected. A compressed block of data for the block of image data is formed, wherein the compressed block of data comprises: (i) data representing the determined origin value, (ii) an indication of the determined level, and (iii) for each image element value in the block of image data, an indication of the selected entry for that image element value.

18 Claims, 9 Drawing Sheets

(56) References Cited

U.S. PATENT DOCUMENTS

| | | | | |
|---|---|---|---|---|
| 5,528,606 | A * | 6/1996 | Kondo | H04N 19/184 |
| | | | | 375/E7.184 |
| 5,850,261 | A * | 12/1998 | Kondo | H04N 19/98 |
| | | | | 375/E7.231 |
| 6,256,347 | B1 * | 7/2001 | Yu | H04N 19/98 |
| | | | | 375/E7.266 |
| 6,501,851 | B1 * | 12/2002 | Kondo | G06T 9/005 |
| | | | | 358/518 |
| 6,621,934 | B1 * | 9/2003 | Yu | H04N 19/428 |
| | | | | 375/E7.098 |
| 6,704,455 | B1 * | 3/2004 | Yamazaki | G06T 9/005 |
| | | | | 382/248 |
| 6,915,014 | B1 * | 7/2005 | Honma | H04N 19/196 |
| | | | | 382/250 |
| 7,190,284 | B1 * | 3/2007 | Dye | G06F 12/023 |
| | | | | 711/170 |
| 8,379,715 | B2 * | 2/2013 | Van De Waerdt | H04N 19/423 |
| | | | | 375/240.03 |
| 2001/0041016 | A1 | 11/2001 | Goldstein et al. | |
| 2002/0015528 | A1 * | 2/2002 | Kondo | H04N 19/587 |
| | | | | 375/E7.188 |
| 2003/0053703 | A1 | 3/2003 | Tabata et al. | |
| 2003/0081845 | A1 * | 5/2003 | Mukherjee | H04N 1/333 |
| | | | | 382/251 |
| 2003/0112869 | A1 * | 6/2003 | Chen | H04N 19/428 |
| | | | | 375/E7.181 |
| 2004/0120517 | A1 * | 6/2004 | Inomata | H04K 1/00 |
| | | | | 380/28 |
| 2004/0179593 | A1 | 9/2004 | Goldstein et al. | |
| 2007/0132860 | A1 * | 6/2007 | Prabhu | H04N 5/77 |
| | | | | 386/E5.067 |
| 2008/0291295 | A1 * | 11/2008 | Kato | H04N 19/17 |
| | | | | 382/254 |
| 2009/0052790 | A1 | 2/2009 | Odagiri et al. | |
| 2011/0033127 | A1 * | 2/2011 | Rasmusson | G06T 9/00 |
| | | | | 382/238 |
| 2014/0153822 | A1 | 6/2014 | Cheong et al. | |
| 2017/0177227 | A1 * | 6/2017 | Zhang | G06F 3/064 |
| 2017/0345207 | A1 * | 11/2017 | Seiler | G06T 1/20 |
| 2017/0353728 | A1 * | 12/2017 | Huang | H04N 19/176 |
| 2019/0289295 | A1 * | 9/2019 | Keinert | H04N 19/18 |
| 2020/0007149 | A1 * | 1/2020 | Fenney | H04N 19/42 |
| 2021/0304441 | A1 * | 9/2021 | Yang | H04N 19/14 |
| 2021/0304446 | A1 * | 9/2021 | Yang | H04N 19/146 |

OTHER PUBLICATIONS

Marino et al; "A DWT-Based Perceptually Lossless Color Image Compression Architecture"; Signals, Systems & Computers; Nov. 1, 1998; vol. 1; pp. 149-153.

Sun et al; "DHTC: An Effective DXTC-based HDR Texture Compression Scheme"; Proceedings of the 23rd ACM Siggraph/Eurographics Symposium on Graphics Hardware-GH '08 Graphics Hardware; Jun. 20, 2008; pp. 85-94.

* cited by examiner

IMAGE DATA COMPRESSION

FIELD

This disclosure relates to data compression and data decompression.

BACKGROUND

Data compression, both lossless and lossy, is desirable in many applications in which data is to be stored in, and/or read from memory. By compressing data before storage of the data in memory, the amount of data transferred to the memory may be reduced. An example of data for which data compression is particularly useful is image data. The term 'image data' is used herein to refer to two-dimensional data that has values corresponding to respective pixel or sample locations of an image. For example, the image may be produced as part of a rendering process on a Graphics Processing Unit (GPU). Image data includes, but is not limited to, depth data to be stored in a depth buffer, pixel data (e.g. colour data) to be stored in a frame buffer, texture data to be stored in a texture buffer and surface normal data to be stored in a surface normal buffer. These buffers may be any suitable type of memory, such as cache memory, separate memory subsystems, memory areas in a shared memory system or some combination thereof.

A GPU may be used to process data in order to generate image data. For example, a GPU may determine pixel values (e.g. colour values) of an image to be stored in a frame buffer which may be output to a display. GPUs usually have highly parallelised structures for processing large blocks of data in parallel. There is significant commercial pressure to make GPUs (especially those intended to be implemented on mobile/embedded devices) operate with reduced latency, reduced power consumption and with a reduced physical size, e.g. a reduced silicon area. Competing against these aims is a desire to use higher quality rendering algorithms to produce higher quality images. Reducing the memory bandwidth (i.e. reducing the amount of data transferred between the GPU and a memory can significantly reduce the latency and the power consumption of the system, which is why compressing the data before transferring the data can be particularly useful. The same is true, to a lesser extent, when considering data being moved around within the GPU itself. Furthermore, the same issues may be relevant for other processing units, e.g. central processing units (CPUs), as well as GPUs.

FIG. 1 shows an example computing system 100 which may be implemented in an electronic device, such as a mobile/embedded device. The computing system 100 comprises a host CPU 102, a GPU 104, a memory 106 (e.g. graphics memory) and a display 108. The CPU 102 is configured to communicate with the GPU 104. Data, which may be compressed data, can be transferred in either direction, between the GPU 104 and the memory 106. Images (e.g. represented with pixel values) which are rendered by the GPU 104 may be stored in memory 106 and displayed on the display 108 via a display interface 116.

The GPU 104 comprises rendering logic 110, a compression/decompression unit 112, and a memory interface 114. The graphics rendering system 100 is arranged such that data can pass, in either direction, between: (i) the CPU 102 and the rendering logic 110; (ii) the CPU 102 and the memory interface 114; (iii) the memory interface 114 and the memory 106; (iv) the rendering logic 110 and the compression/decompression unit 112; (v) the compression/decompression unit 112 and the memory interface 114; and (vi) the memory 106 and the display interface 116. In some examples, the graphics rendering system 100 may be further arranged such that data can pass, in either direction between the compression/decompression unit 112 and the display interface 116, and such that data can pass from the display interface 116 to the display 108.

In operation, the GPU 104 may process regions of image data individually. The regions may for example represent rectangular (including square) portions (or "tiles") of the render space (i.e. the two-dimensional space representing, for example, an image area to be rendered). The rendering logic 110 may perform scan conversion and rasterization of graphics primitives, such as, but not limited to, triangles and lines, using known techniques such as depth test and texture mapping. The rendering logic 110 may contain cache units to reduce memory traffic. Some data is read or written by the rendering logic 110, from or to the memory 106 via the memory interface 114 (which may include a cache) but for other data, such as data to be stored in a buffer, such as the frame buffer, the data preferably goes from the rendering logic 110 to the memory interface 114 via the compression/decompression unit 112. The compression/decompression unit 112 reduces the amount of data that is to be transferred across the external memory bus to the memory 106 by compressing the data.

The display interface 116 sends data defining a completed image to the display 108. An uncompressed image may be accessed directly from the memory 106. Compressed data may be decompressed via the compression/decompression unit 112 and sent as uncompressed data to the display 108. In alternative examples the compressed data could be read directly by the display interface 116 and the display interface 116 could include logic for decompressing the compressed data in an equivalent manner to the decompression of the compression/decompression unit 112. Although shown as a single entity, the compression/decompression unit 112 may contain multiple parallel compression and/or decompression units for enhanced performance.

As is known to a person of skill in the art, the rendering logic 110 may generate a set of one or more colour values (e.g. RGB or RGBA) for each pixel in the render space and cause the colour values to be stored in the frame buffer. The collection of colour values for a frame may be referred to herein as colour data, image data, frame buffer data or simply frame data. The rendering logic 110 may also generate other image data, such as depth data, surface normal data, lighting data, etc., and may store those image data values in one or more buffers in memory. These buffers may, in some cases, be referred to as frame buffers, while in other cases the term "frame buffer" may be reserved for buffers which store colour values or which store data to be sent to the display. In some graphics rendering systems the image data values stored in a buffer for a particular render may be used by the rendering logic 110 when performing one or more subsequent renders. For example, colour values generated by one render may represent a texture which can be stored in memory 106 (e.g. in a compressed form), and the texture can be read from the memory 106 (e.g. and decompressed) to be applied as a texture to a surface in one or more subsequent renders. Similarly, surface normal values generated for a geometric model in one render may be used to apply lighting effects to the same model during the rendering of one or more subsequent renders. Furthermore, surface depth values generated and stored in one render can be read back in for use in the rendering of one or more subsequent renders for the same model.

Since the image data (e.g. colour data) can be quite large the memory bandwidth associated with writing image data to a buffer in memory and reading the image data from the buffer in memory may be a significant portion of the total memory bandwidth of the graphics processing system and/or the GPU. As a result, the image data is often compressed, via the compression/decompression unit 112, prior to being stored in a buffer and decompressed, via the compression/decompression unit 112, after being read from the buffer.

When a lossless compression technique is used to compress data and then a complementary lossless decompression technique is used to decompress the data, the original data can be recovered, with no loss of data (assuming no errors occurred during the compression or decompression processes). The extent to which the data is compressed can be expressed as a compression ratio, where the compression ratio is given by dividing the size of the uncompressed data by the size of the compressed data. The compression ratio achieved by a lossless compression technique typically depends upon the data that is being compressed. For example, lossless compression techniques tend to be able to achieve relatively high compression ratios when compressing highly correlated data; whereas lossless compression techniques tend to achieve relatively low compression ratios when compressing uncorrelated (e.g. random) data. Therefore, it is difficult to guarantee that a lossless compression technique will achieve a particular compression ratio (e.g. a compression ratio of 2:1). Therefore, if only a lossless compression ratio is used then the system typically must be able to handle situations in which a desired compression ratio (e.g. 2:1) is not achieved, and for example, sometimes no compression at all results from using a lossless compression technique.

In some situations, a guaranteed compression ratio can be considered more important than a guarantee that no data will be lost during the compression. In these situations, a lossy compression technique can be used, which can achieve a guaranteed compression ratio, although some data may be lost during the compression process.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

There is provided a computer-implemented method of performing lossy compression on a block of image data in accordance with a multi-level difference table, wherein the block of image data comprises a plurality of image element values, wherein each level of the multi-level difference table comprises a plurality of entries, the method comprising: determining an origin value for the block of image data; determining a level within the multi-level difference table for the block of image data; for each image element value in the block of image data, selecting one of the entries at the determined level within the multi-level difference table; and forming a compressed block of data for the block of image data, the compressed block of data comprising: (i) data representing the determined origin value, (ii) an indication of the determined level, and (iii) for each image element value in the block of image data, an indication of the selected entry for that image element value.

A size of a range of values represented by the entries in a level may be different for different levels of the multi-level difference table.

Each entry of the multi-level difference table may represent a value which can be used to represent a difference between an image element value and the origin value for the block of image data.

The multi-level difference table may be predetermined, i.e. the values of the entries of the multi-level difference table may be determined before the method of performing lossy compression on a block of image data begins.

The origin value may be determined based on the image element values in the block of image data. Said determining an origin value for the block of image data may comprise identifying a minimum image element value in the block of image data. Said determining an origin value for the block of image data may further comprise reducing the number of bits used to represent the minimum image element value. The data representing the determined origin value may have fewer bits than any one of the image element values in the block of image data.

The level within the multi-level difference table may be determined based on the determined origin value and one or more of the image element values in the block of image data. Said determining a level within the multi-level difference table for the block of image data may comprise: determining a maximum difference between the determined origin value and any one of the image element values in the block of image data; and selecting, from the multi-level difference table, the level whose largest entry most closely represents the determined maximum difference.

For each of the image element values, said one of the entries at the determined level may be selected based on the image element value and the determined origin value. Said selecting one of the entries at the determined level within the multi-level difference table, for each of the image element values in the block of image data, may comprise: determining a difference value for the image element value by determining a difference between the determined origin value and the image element value; and selecting, from the determined level of the multi-level difference table, the entry which most closely represents the determined difference value.

The first entry in each level of the multi-level difference table may represent a value of zero.

In some examples, the number of bits used to represent the compressed block of data does not depend upon the values of the image element values in the block of image data, such that a compression ratio of the lossy compression is guaranteed.

The image element values may each have 8 bits, wherein the block of image data may comprise four image element values, such that the block of image data may have 32 bits, and wherein the compressed block of data may have 16 bits, comprising: (i) 5 bits of data representing the determined origin value, (ii) 3 bits for the indication of the determined level, and (iii) 2 bits for each of the four image element values for the indication of the selected entry for that image element value.

The image element values may be in an integer format. The block of image data may be compressed by performing operations including one or more of addition operations, subtraction operations and compare operations on the image element values in the integer format, but the method of compressing the block of image data might not involve performing any multiplication operations or division operations.

The block of image data may relate to one channel of a block of multi-channel image data, wherein different channels of the multi-channel image data may be compressed independently.

The block of multi-channel image data may be colour data for a block of colour values, comprising: (i) a first block of image data relating to a red channel of the block of colour values, (ii) a second block of image data relating to a green channel of the block of colour values, and (iii) a third block of image data relating to a blue channel of the block of colour values, and wherein before the three blocks of image data are compressed independently, colour decorrelation may be performed on the colour values. The multi-channel image data may be colour data in an RGB format such that each colour value comprises a red value (R), a green value (G) and a blue value (B), wherein said colour decorrelation may comprise calculating the image element values (R') of the first block of image data in accordance with the equation R'=R-G, wherein said colour decorrelation may comprise determining the image element values (G') of the second block of image data in accordance with the equation G'=G, and wherein said colour decorrelation may comprise calculating the image element values (B') of the third block of image data in accordance with the equation B'=B-G.

The multi-channel image data may be colour data in an RGB format such that each colour value comprises a red value (R), a green value (G) and a blue value (B), and the method may comprise converting the colour data to a luma-chroma format which comprises: (i) a first block of image data relating to a luma channel (Y) for a block of colour values, (ii) a second block of image data relating to a first chroma channel (Cb) for the block of colour values, and (iii) a third block of image data relating to a second chroma channel (Cr) for the block of colour values, wherein after the colour data has been converted to the luma-chroma format, the three blocks of image data may be compressed independently.

There may be provided a method of compressing a block of image data, comprising: determining whether a lossless compression of the block of image data will satisfy a target compression ratio for the block of image data; and if it is determined that the lossless compression of the block of image data will not satisfy the target compression ratio, performing any of the lossy compression methods described herein on the block of image data, wherein a compression ratio of the lossy compression is guaranteed to satisfy the target compression ratio for the block of image data. If it is determined that the lossless compression of the block of image data will satisfy the target compression ratio, the lossless compression may be performed on the block of image data to form a compressed block of data. Said determining whether a lossless compression of the block of image data will satisfy a target compression ratio for the block of image data may comprise: predicting an amount of compressed data that would result from performing said lossless compression on the block of image data; and determining whether said predicted amount of compressed data would satisfy the target compression ratio. Said determining whether a lossless compression of the block of image data will satisfy a target compression ratio for the block of image data may comprise: performing the lossless compression on the block of image data; and determining whether the amount of compressed data resulting from performing said lossless compression on the block of image data satisfies the target compression ratio.

The method may further comprise storing an indication in a header associated with the compressed block of data to indicate whether the block has been compressed with the lossless compression or with the lossy compression.

The block of image data may be one of a plurality of blocks of image data representing an image, wherein there may be a total image target compression ratio which relates to the whole image, and wherein the method may comprise modifying the target compression ratio for the block of image data in dependence on the amount of compressed data that has been formed for other blocks of image data relating to the same image, such that the total image target compression ratio is satisfied.

The method may further comprise storing the compressed block of data in a memory.

The method may be performed using dedicated hardware.

There is provided a compression unit configured to perform lossy compression on a block of image data in accordance with a multi-level difference table, wherein the block of image data comprises a plurality of image element values, wherein each level of the multi-level difference table comprises a plurality of entries, the compression unit comprising: origin value determination logic configured to determine an origin value for the block of image data; level determination logic configured to determine a level within the multi-level difference table for the block of image data; entry selection logic configured to select, for each image element value in the block of image data, one of the entries at the determined level within the multi-level difference table; and compressed block formation logic configured to form a compressed block of data for the block of image data, the compressed block of data comprising: (i) data representing the determined origin value, (ii) an indication of the determined level, and (iii) for each image element value in the block of image data, an indication of the selected entry for that image element value.

There may be provided a compression unit configured to compress a block of image data, the compression unit comprising: a first compression unit configured to perform lossless compression on a block of image data; a second compression unit as described in any of the examples herein configured to perform lossy compression on a block of image data; and compression technique determination logic configured to determine whether a lossless compression of the block of image data performed by the first compression unit will satisfy a target compression ratio for the block of image data, wherein the compression technique determination logic is configured to, if it determines that the lossless compression of the block of image data will not satisfy the target compression ratio, cause the second compression unit to perform lossy compression on the block of image data, wherein a compression ratio of the lossy compression is guaranteed to satisfy the target compression ratio for the block of image data.

There may be provided a compression unit configured to perform any of the compression methods described herein.

There may be provided a method of manufacturing, using an integrated circuit manufacturing system, a compression unit as described herein, the method comprising: processing, using a layout processing system, a computer readable description of the compression unit so as to generate a circuit layout description of an integrated circuit embodying the compression unit; and manufacturing, using an integrated circuit generation system, the compression unit according to the circuit layout description.

There may be provided a computer-implemented method of decompressing a compressed block of data in accordance with a multi-level difference table, wherein the compressed block of data represents a block of image data comprising a plurality of image element values, wherein each level of the multi-level difference table comprises a plurality of entries, the method comprising: determining an origin value for the block of image data using data representing the origin value from the compressed block of data; identifying a level within the multi-level difference table for the block of image data using an indication of the level from the compressed block of data; for each image element value in the block of image data: using a respective entry indication from the compressed block of data to identify one of the entries at the identified level within the multi-level difference table; and determining the image element value using: (i) the determined origin value for the block of image data, and (ii) the identified entry at the identified level within the multi-level difference table for the image element value.

There may be provided a decompression unit configured to decompress a compressed block of data in accordance with a multi-level difference table, wherein the compressed block of data represents a block of image data comprising a plurality of image element values, wherein each level of the multi-level difference table comprises a plurality of entries, the decompression unit comprising: origin value determination logic configured to determine an origin value for the block of image data using data representing the origin value from the compressed block of data; level identification logic configured to identify a level within the multi-level difference table for the block of image data using an indication of the level from the compressed block of data; image element value determination logic configured to, for each image element value in the block of image data: use a respective entry indication from the compressed block of data to identify one of the entries at the identified level within the multi-level difference table; and determine the image element value using: (i) the determined origin value for the block of image data, and (ii) the identified entry at the identified level within the multi-level difference table for the image element value.

The compression unit and/or decompression unit may be embodied in hardware on an integrated circuit. There may be provided a method of manufacturing, at an integrated circuit manufacturing system, the compression unit and/or decompression unit. There may be provided an integrated circuit definition dataset that, when processed in an integrated circuit manufacturing system, configures the system to manufacture the compression unit and/or decompression unit. There may be provided a non-transitory computer readable storage medium having stored thereon a computer readable description of an integrated circuit that, when processed in an integrated circuit manufacturing system, causes the integrated circuit manufacturing system to manufacture an integrated circuit embodying the compression unit and/or decompression unit.

There may be provided an integrated circuit manufacturing system comprising: a non-transitory computer readable storage medium having stored thereon a computer readable integrated circuit description that describes the compression unit and/or decompression unit; a layout processing system configured to process the integrated circuit description so as to generate a circuit layout description of an integrated circuit embodying the compression unit and/or decompression unit; and an integrated circuit generation system configured to manufacture the compression unit and/or decompression unit according to the circuit layout description.

There may be provided computer program code for performing a method as described herein. In other words, there may be provided computer readable code configured to cause any of the methods described herein to be performed when the code is run. There may be provided non-transitory computer readable storage medium having stored thereon computer readable instructions that, when executed at a computer system, cause the computer system to perform the methods as described herein.

The above features may be combined as appropriate, as would be apparent to a skilled person, and may be combined with any of the aspects of the examples described herein.

BRIEF DESCRIPTION OF THE DRAWINGS

The present invention is described by way of example with reference to the accompanying drawings. In the drawings.

Figure 1:
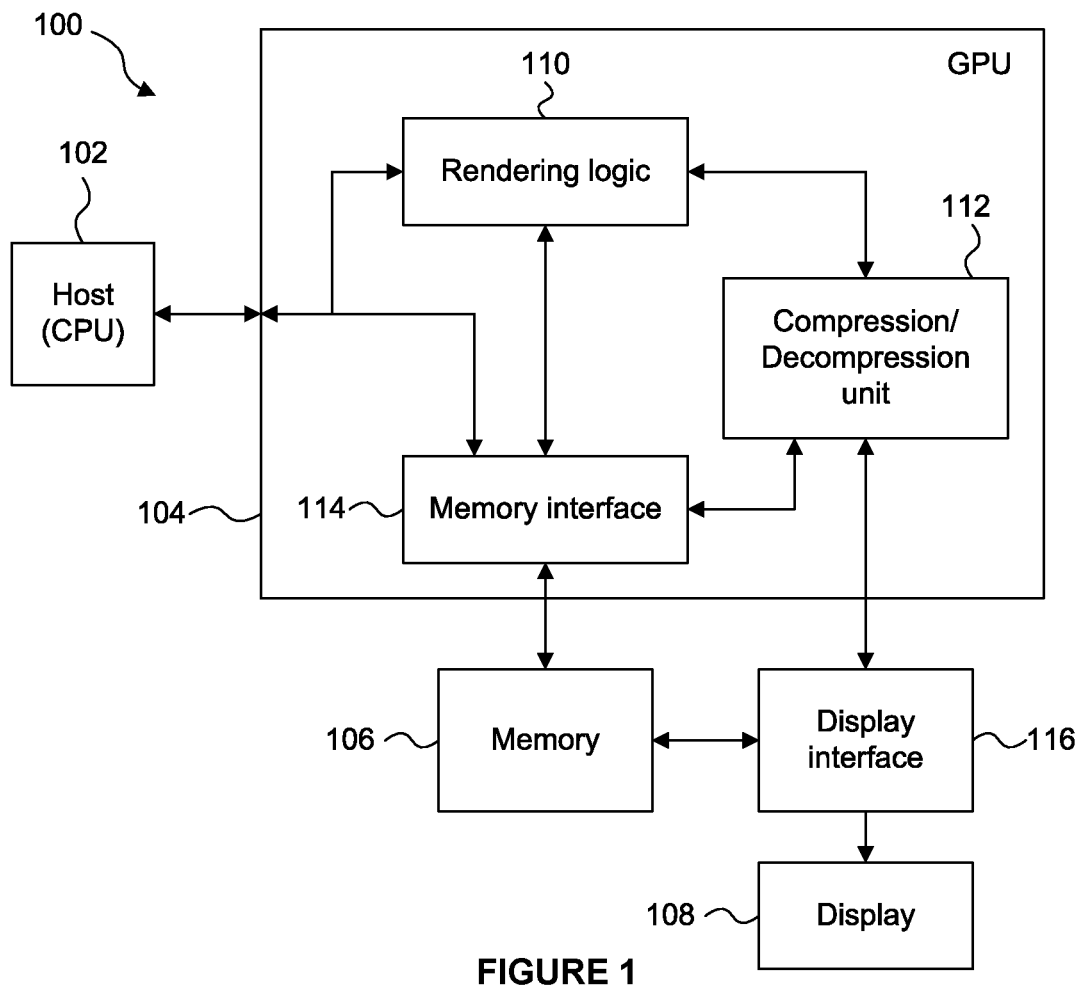
FIG. 1 shows a computer system in which a compression/decompression unit is implemented on a graphics processing unit.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

As described above, it can be useful to have a lossy compression technique (and a complementary decompression technique) which is guaranteed to satisfy a fixed compression ratio (such as 2:1) without too much loss in quality of the data, e.g. without visually perceptible artefacts being introduced into the image due to the lossy compression. Some previous high-end lossy compression algorithms can achieve fixed compression ratios without too much loss in quality of the data, but these previous high-end lossy compression algorithms involve performing complex operations (such as filtering, multiplication and division operations) on floating point or fixed point values and may require internal buffering of values during the compression process. As such, these previous high-end lossy compression algorithms are often considered unsuitable for use in small, low cost and/or low power computing systems, such as may be implemented in mobile devices such as smart phones and tablets or other devices where size, cost and/or power are constrained.

One previous low-end lossy compression technique involves compressing data values by truncating the values, i.e. simply removing some of the least significant bits (LSBs) from the data values. To achieve a 2:1 compression ratio, half of the bits of the data values would need to be removed. Although, this low-end lossy compression technique could be implemented in a small, low cost and low power system, it often causes an unacceptable degradation of the quality of the data. For example, if the data values are pixel values of an image then this low-end lossy compression technique would often introduce a visible banding effect into the image, which is generally not desirable.

Examples of lossy compression and decompression techniques are described herein which are guaranteed to satisfy a fixed compression ratio (such as 2:1) without too much loss in quality of the data (e.g. without significant visually perceptible artefacts being introduced into the image due to the lossy compression), and can be implemented in a small, low cost and low power computing system. The examples described herein are simple to implement. For example, they may operate on image element values in an integer format rather than a floating point format, and they may be performed by performing simple operations such as addition operations, subtraction operations and compare operations, and without performing more complex operations (which may be expansive in terms of the amount of data needed to represent the values) such as multiplication operations or division operations, and without requiring internal buffering of values during the compression or decompression process. In these examples, these simple operations (e.g. addition operations, subtraction operations and compare operations) are "integer operations", meaning that they operate on integer numbers, e.g. the image element values in the integer format.

The lossy compression techniques described herein may be implemented in a compression unit implemented in dedicated hardware, e.g. using fixed-function circuitry. Similarly, the lossy decompression techniques described herein may be implemented in a decompression unit implemented in dedicated hardware, e.g. using fixed-function circuitry. In these examples, the compression unit and the decompression unit may be small in terms of physical size (e.g. silicon area) when compared with previous high-end compression and decompression units implemented in hardware. The lossy compression units and decompression units described herein are suitable for being implemented in a small, low-cost processing unit (e.g. a GPU or a CPU), with small silicon area and low power consumption and low latency. This is achieved without degrading the quality of the data (e.g. the image quality) too much.

Image data to be compressed can be represented as a 2D array of image element values (e.g. pixel values). If the image data comprises multiple channels then the different channels are compressed independently (although a pre-processing step to the compression may be performed for colour decorrelation or to convert the RGB values to YCbCr values, and a corresponding post-processing step could be performed after the decompression). In examples described herein, at least one block of image elements within the array (e.g. a 2×2 block) is compressed in a lossy manner.

Figure 2:
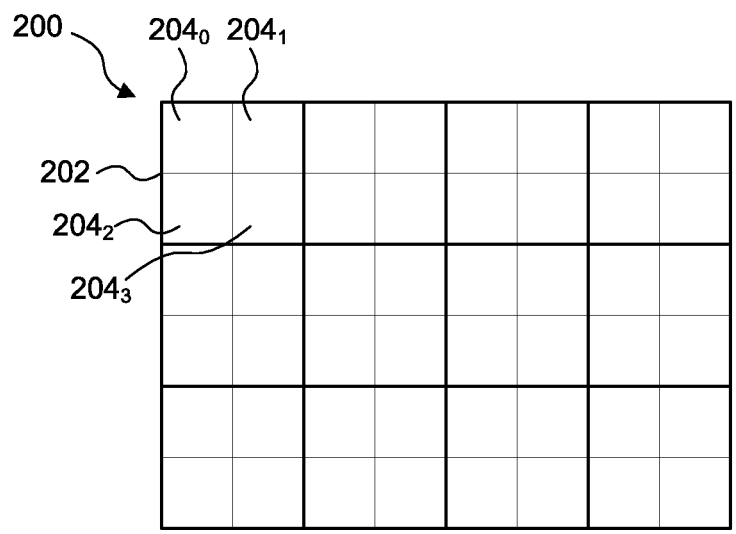
FIG. 2 shows an array of image data comprising blocks of image data.

FIG. 2 shows an array of image data comprising blocks of image data. In this example, the array of image data 200 represents an image represented by pixel values, wherein the blocks of image data are 2×2 blocks of pixel values. The top left block of pixel values is denoted with the reference numeral 202, which is made up of four pixel values $204_0$, $204_1$, $204_2$ and $204_3$. In other examples, the blocks of image data could be a different size and/or shape. For example, in other examples, the blocks of image data could be 4×1 blocks of image element values, or 4×4 blocks of image element values just to give two examples.

The examples described herein relate to compressing a block of pixel values, wherein the pixel values represent an image. However, it is to be understood that pixel values are just one example of image element values which may be compressed using the techniques described herein. More generally, a block of image data can be compressed to form a compressed block of data, and a compressed block of data can be decompressed to form a block of image data, wherein the image data comprises a plurality of image element values. To give some examples, the image element values may be: (i) texel values representing a texture, (ii) pixel values representing an image, (iii) depth values representing depths of surfaces within a scene at different sample positions, (iv) surface normal values representing the directions of normal vectors of surfaces within a scene at different sample positions, or (v) lighting values representing lighting on surfaces within a scene at different sample positions. The lighting values represent a "light map". A light map can be considered to be a type of texture, such that it can be used and processed in the same way as a texture. Pixel values and texel values are examples of colour values (where pixel values represent an image and texel values represent a texture). These colour values may be monochromatic, i.e. they have a single colour channel. However, in some examples, colour values may be multi-channel values. For example, colour values may be in a RGB format wherein they have a Red channel (R), a Green channel (G) and a Blue channel (B). In other examples, colour values may be in a RGBA format wherein they have a Red channel (R), a Green channel (G), a Blue channel (B) and an Alpha channel (A). In other examples, colour values may be in a YCbCr format wherein they have a luma channel (Y), a first chroma channel (Cb) and a second chroma channel (Cr). As in known in the art, there are many other formats that multi-channel colour values may have. Each channel of the multi-channel colour values comprises values which relate to that particular channel. The values of the different channels of multi-channel values may be compressed and decompressed independently. In the examples described herein, when we refer to "pixel values" we may be referring to the values of one of the channels of multi-channel colour values.

As a brief overview of the lossy compression technique described herein, a block of pixel values 202 can be compressed by: determining an origin value (e.g. a base value) for the block 202, choosing (or "determining" or "identifying") a level within a multi-level difference table (which may be referred to as a multi-level quantized delta table), and for each pixel value 204 in the block 202 using some bits (e.g. 2 bits per pixel value) to select one of the entries at the chosen level of the multi-level difference table. The entries in the multi-level difference table represent differences (i.e. adjustments) from the origin value. A size of a range of values represented by the entries in a level is different for different levels of the multi-level difference table. This allows a level to be selected in dependence upon the size of the range of pixel values within the block of pixel values.

Figure 3A:
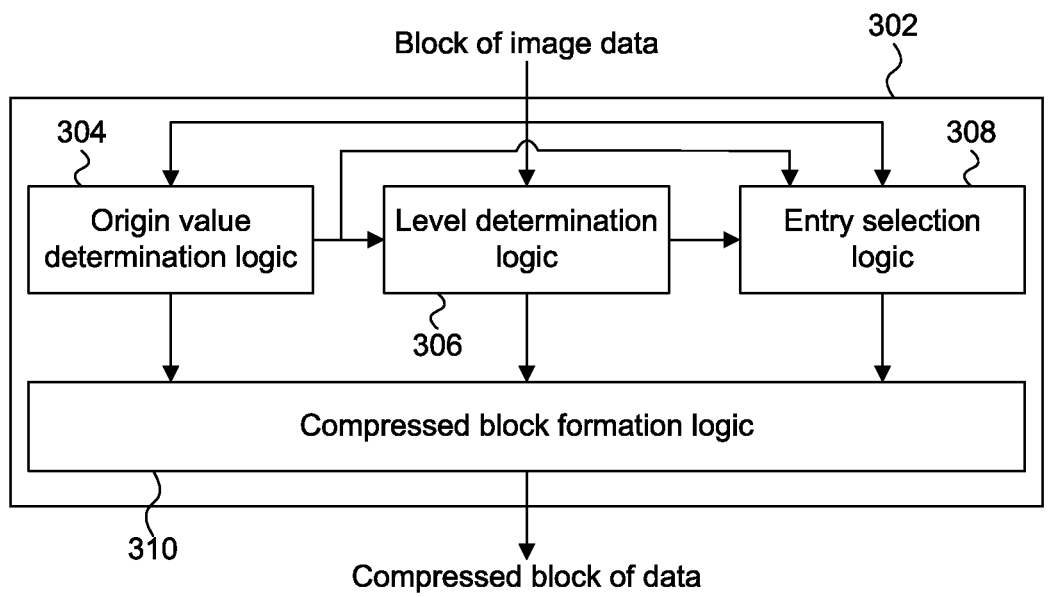
FIG. 3a shows a lossy compression unit.

An example of a lossy compression technique is now described with reference to FIGS. 3a and 3b. FIG. 3a shows a compression unit 302 configured to perform lossy compression on a block of image data in accordance with a multi-level difference table. The compression unit 302 could be implemented as part of the compression/decompression unit 112 within the GPU 104. The compression unit 302 is configured to receive a block of image data, perform lossy compression on the block of image data to form a compressed block of data, and output the compressed block of data, e.g. for storage in a memory. The compression unit 302 comprises origin value determination logic 304, level determination logic 306, entry selection logic 308 and compressed block formation logic 310. The origin value determination logic 304, the level determination logic 306, the entry selection logic 308 and the compressed block formation logic 310 may be implemented in dedicated hardware, e.g. in fixed-function circuitry.

Figure 3B:
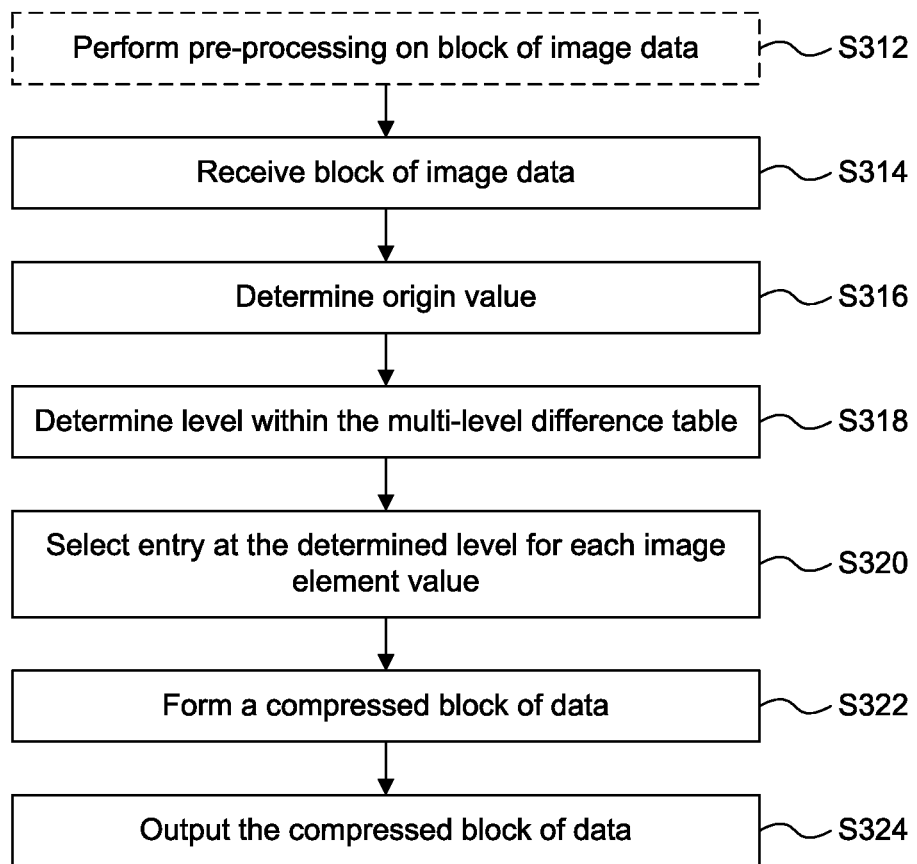
FIG. 3b is a flow chart for a method of performing lossy compression on a block of image data.

FIG. 3b is a flow chart for a method of performing lossy compression on a block of image data 202. As described in more detail below, pre-processing may be performed on the block of image data in step S312. This step is shown in FIG. 3b with a dashed line because this step is optional. In step S314 the block of image data 202 is received at the compression unit 302. The block of image data 202 is provided to the origin value determination logic 304, the level determination logic 306 and the entry selection logic 308. As shown in FIG. 2, in this example, the block of image data 202 is a 2×2 block of pixel values $204_0$ to $204_3$.

In step S316 the origin value determination logic 304 determines an origin value for the block of pixel data 202. The origin value is determined based on the pixel values 204 in the block of pixel data 202. For example, the origin value may be a base value, wherein the base value is determined by identifying a minimum pixel value in the block of pixel values 202. Identifying the minimum value from a set of values is a simple process to perform in processing logic, and methods for identifying the minimum value from a set of values are known in the art.

The determination of the base value may also comprise reducing the number of bits used to represent the minimum pixel value in the block of pixel values 202. Some of the bits of the base value can be implied, e.g. one or more least significant bits can be implied to be zeroes so that they do not need to be stored when the base value is stored. For example, each of the pixel values 204 may be represented using 8 bits, and the base value may be represented using fewer than 8 bits, e.g. using 5 bits. In this way, the data representing the base value may comprise fewer bits (e.g. 5 bits) than any one of the pixel values 204 in the block of pixel data 202 (e.g. 8 bits). A reduction in the number of bits used to represent the base value can comprise identifying the minimum pixel value 204 in the block of pixel values 202 and rounding the minimum pixel value according to a rounding mode. For example, the rounding mode may be a round towards zero rounding mode, and the rounding may involve truncating (or "clamping") the minimum pixel value, i.e. replacing one or more (e.g. three) of the least significant bits (LSBs) of the minimum pixel value with a zero such that these bits do not need to be stored. This is very simple to implement. In other examples, the rounding mode could be a round away from zero rounding mode or a round to nearest rounding mode, but these rounding modes might be slightly more complicated to implement compared to simply clamping the minimum pixel value.

The level determination logic 306 receives: (i) the block of pixel data 202, and (ii) an indication of the determined origin value from the origin value determination logic 304. In step S318 the level determination logic 306 determines a level within the multi-level difference table for the block of pixel data 202, e.g. based on the determined origin value and one or more of the pixel values 204 in the block of pixel values 202. This step is described herein as "determining" a level within the multi-level difference table, and it is to be understood that this may also be described as "choosing" or "identifying" a level within the multi-level difference table. Each level of the multi-level difference table comprises a plurality of entries. Each entry in the multi-level difference table represents a value, which can be used to represent a difference (or a "delta") between a pixel value and the origin value. In examples, described herein each level comprises the same number of entries. As described above, a size of a range of values represented by the entries in a level is different for different levels of the multi-level difference table. In this way, different levels are suitable for representing blocks of pixel data having different distributions of pixel values within them. For example, some of the levels of the multi-level difference table have entries representing a small range of values, and these levels will be useful for compressing blocks of pixel data in which the pixel values do not vary much; whereas some of the other levels of the multi-level difference table have entries representing a large range of values, and these levels will be useful for compressing blocks of pixel data in which the pixel values do vary a lot. Often there is some correlation between pixel values within a small block, so pixel values within a block of pixel data are often quite similar to each other (e.g. if all of the pixel values are representing the same object in an image). The smaller levels of the multi-level difference table will be useful in these situations and will not introduce large errors into the pixel values. However, the larger levels of the multilevel difference table are still able to compress the blocks for which the pixels in the block are not very similar. An example multi-level difference table is shown in Table 1. This example is for 8-bit pixel values, such that each pixel value is in the range from 0 to 255. In different examples, the multi-level difference table may be different to that shown in Table 1.

TABLE 1 multi-level difference table

| Level | Entry 0 | Entry 1 | Entry 2 | Entry 3 |
|---|---|---|---|---|
| 0 | 0 | 2 | 4 | 8 |
| 1 | 0 | 4 | 8 | 16 |
| 2 | 0 | 8 | 16 | 32 |
| 3 | 0 | 16 | 32 | 64 |
| 4 | 0 | 32 | 64 | 96 |
| 5 | 0 | 48 | 96 | 128 |
| 6 | 0 | 64 | 128 | 176 |
| 7 | 0 | 96 | 192 | 248 |

In this example, the first entry in each level of the multi-level difference table represents a value of zero. This is not essential, but it can be useful in some situations because it allows a pixel value of zero (e.g. which may be used to represent a completely black colour) to be compressed without changing its value. Therefore, in these examples, the use of the multi-level difference table to compress pixel values of an image does not introduce artefacts into completely black regions of the image. Furthermore, since every level has zero as its first entry, it may not be necessary to store the values of the first entries of the levels in the multi-level difference table, thereby reducing an amount of memory used to store the multi-level difference table.

The multi-level difference table is predetermined. In other words, the values of the entries of the multi-level difference table are determined before the method of performing lossy compression (or lossy decompression) on a block of image data begins. In some examples, the multi-level difference table is stored, e.g. in a small piece of dedicated memory on the compression unit 302, and the level determination logic 306 and the entry selection logic 308 can perform lookups to this memory to access data from the stored multi-level difference table. In other examples, the values of the multi-level difference table may be hardcoded into the circuitry of the level determination logic 306 and the entry selection logic 308. Storing the multi-level difference table in a memory would allow the values of the entries in the multi-level difference table to be changed after the compression unit 302 has been manufactured, so it allows more flexibility in the way in which the compression unit 302 performs the lossy compression. However, hardcoding the values of the multi-level difference table into the circuitry of the level determination logic 306 and the entry selection logic 308 will provide for faster execution (thereby reducing the latency of the compression process), and will avoid the use of memory to store the multi-level difference table (thereby reducing the silicon area of the compression unit 302), but it would be difficult to change the values of the multi-level difference table after the compression unit 302 had been manufactured, so hardcoding the values of the multi-level difference table into the circuitry of the compression unit 302 is a relatively inflexible approach.

In the example shown in Table 1, the values of the entries have low Hamming weights, i.e. when represented as binary numbers they have a relatively low number of 1s and a relatively high number of zeroes in the binary representations. This can make comparing values to these numbers simpler to implement in hardware which operates on binary numbers.

Figure 4:
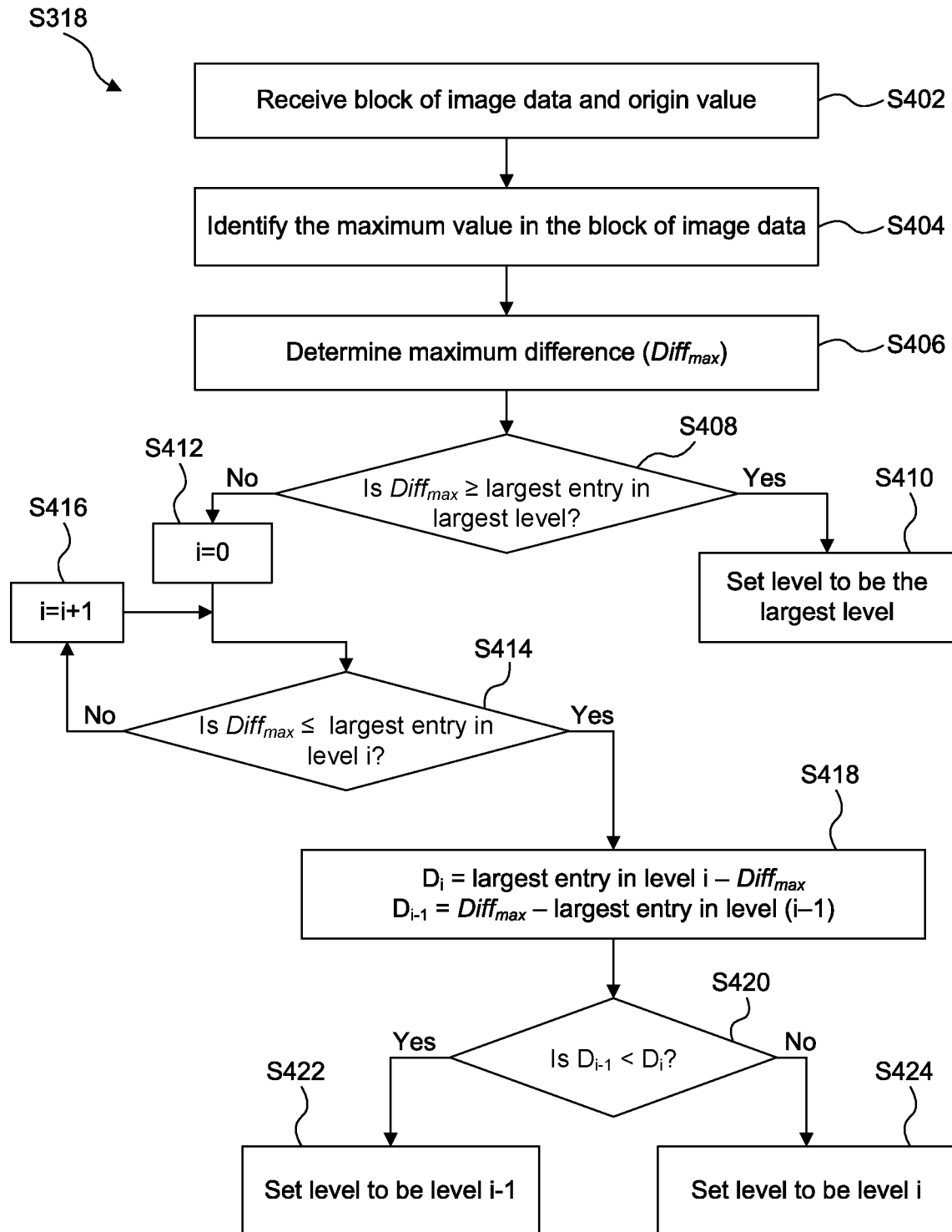
FIG. 4 is a flow chart for a method of determining a level within a multi-level difference table for use in compressing the block of image data.

FIG. 4 is a flow chart showing an example of how step S318 could be performed in the level determination logic 306 to determine (i.e. identify) a level within the multi-level difference table for the block of pixel data 202. According to the method shown in FIG. 4, a maximum difference between the determined origin value and any one of the pixel values 204 in the block of pixel data 202 is determined, and then the level whose largest entry most closely represents the determined maximum difference is selected from the multi-level difference table.

In particular, in step S402 the block of image data (e.g. the block of pixel data 202) and the origin value (e.g. the base value) determined by the origin value determination logic 304 are received at the level determination logic 306. In step S404 the level determination logic 306 identifies the maximum pixel value ($pix_{max}$) in the block of pixel data 202. In step S406 the maximum difference ($Diff_{max}$) is determined by subtracting the origin value (which in this example is the base value (base Value)) from the maximum pixel value. In other words, $Diff_{max} = pix_{max} - baseValue$.

The level in the multi-level difference table is determined by comparing the last entry in one or more of the levels of the multi-level difference table with the maximum difference, $Diff_{max}$. In particular, in step S408 the maximum difference, $Diff_{max}$, is compared to the largest entry in the largest level of the multi-level difference table. In the example shown above in Table 1, the largest level is level 7, and the largest entry in level 7 represents a value of 248. If the maximum difference, $Diff_{max}$, is greater than or equal to the largest entry in the largest level of the multi-level difference table, then the method passes to step S410 in which the level is set to be the largest level (e.g. level 7). This level allows very large differences between the pixel values 204 within the block of pixels 202 to be represented. One example of a situation in which large differences like this can occur within a pixel block is when one or more pixels within the block represent a completely bright white region (e.g. a value of 255 in each 8-bit colour channel), and one or more pixels within the block represent a completely black region (e.g. a value of 0 in each colour channel), which can for example occur when the pixels are representing text, e.g. black text on a white background.

If the maximum difference, $Diff_{max}$, is less than the largest entry in the largest level of the multi-level difference table, then the method passes from step S408 to step S412 in which a parameter, i, is set to zero. Then in step S414 the level determination logic 306 determines whether the maximum difference, $Diff_{max}$, is less than or equal to the largest entry in level i of the multi-level difference table. In the example shown in Table 1 above, the largest entry in level 0 represents a value of 8. If $Diff_{max}$ is not less than or equal to the largest entry in level i of the multi-level difference table then the method passes from step S414 to step S416 in which the parameter, i, is incremented and then the method passes back to step S414 to consider the next level (e.g. level 1 in this iteration). In the example shown in Table 1 above, the largest entry in level 1 represents a value of 16. This loop of step S414 and step S416 continues until it is determined in step S414 that $Diff_{max}$ is less than or equal to the largest entry in level i of the multi-level difference table, and then the method passes to step S418.

In step S418, a difference ($D_i$) between the largest entry in level i and the maximum difference $Diff_{max}$ is determined, and a difference ($D_{i-1}$) between the maximum difference $Diff_{max}$ and the largest entry in level (i−1) is determined. In step S420, the level determination logic 306 determines whether $D_{i-1} < D_i$. If $D_{i-1}$ is less than $D_i$ then the method passes to step S422 in which the level is set to be level (i−1). However, if $D_{i-1}$ is not less than $D_i$ (e.g. if $D_{i-1}$ is greater than $D_i$) then the method passes to step S424 in which the level is set to be level i. Therefore, steps S408 to S424 are an example of a way to implement a process of selecting, from the multi-level difference table, the level whose largest entry most closely represents the maximum difference $Diff_{max}$.

As an example, if the four pixel values 204 within the block of pixel data 202 are 8-bit values representing values of 52 (i.e. 00110100 in binary), 46 (i.e. 00101110 in binary), 60 (i.e. 00111100 in binary) and 66 (i.e. 01000010 in binary) then the origin value, i.e. the base value, can be determined in an example by replacing the three least significant bits of the minimum of these four values (i.e. the value of 46) with zeroes such that the base value is 40 (i.e. a binary value of 00101000). This base value can be stored by just storing the first five bits (00101). In this example, the maximum difference value $\text{Diff}_{max}$ will be 26 because 66−40=26. Therefore, the loop of steps S414 and S416 in this example will choose i to be 2 because 26 is greater than 16 (which is the largest entry in level 1) but less than 32 (which is the largest entry in level 2). Therefore, in this example, $D_i$=6 and $D_{i-1}$=10, so the level will be set to level 2.

Returning to FIG. 3*b*, after step S318, in step S320, for each pixel value 204 in the block of pixel data 202, one of the entries at the determined level within the multi-level difference table is selected, e.g. based on the pixel value 204 and the origin value.

Figure 5:
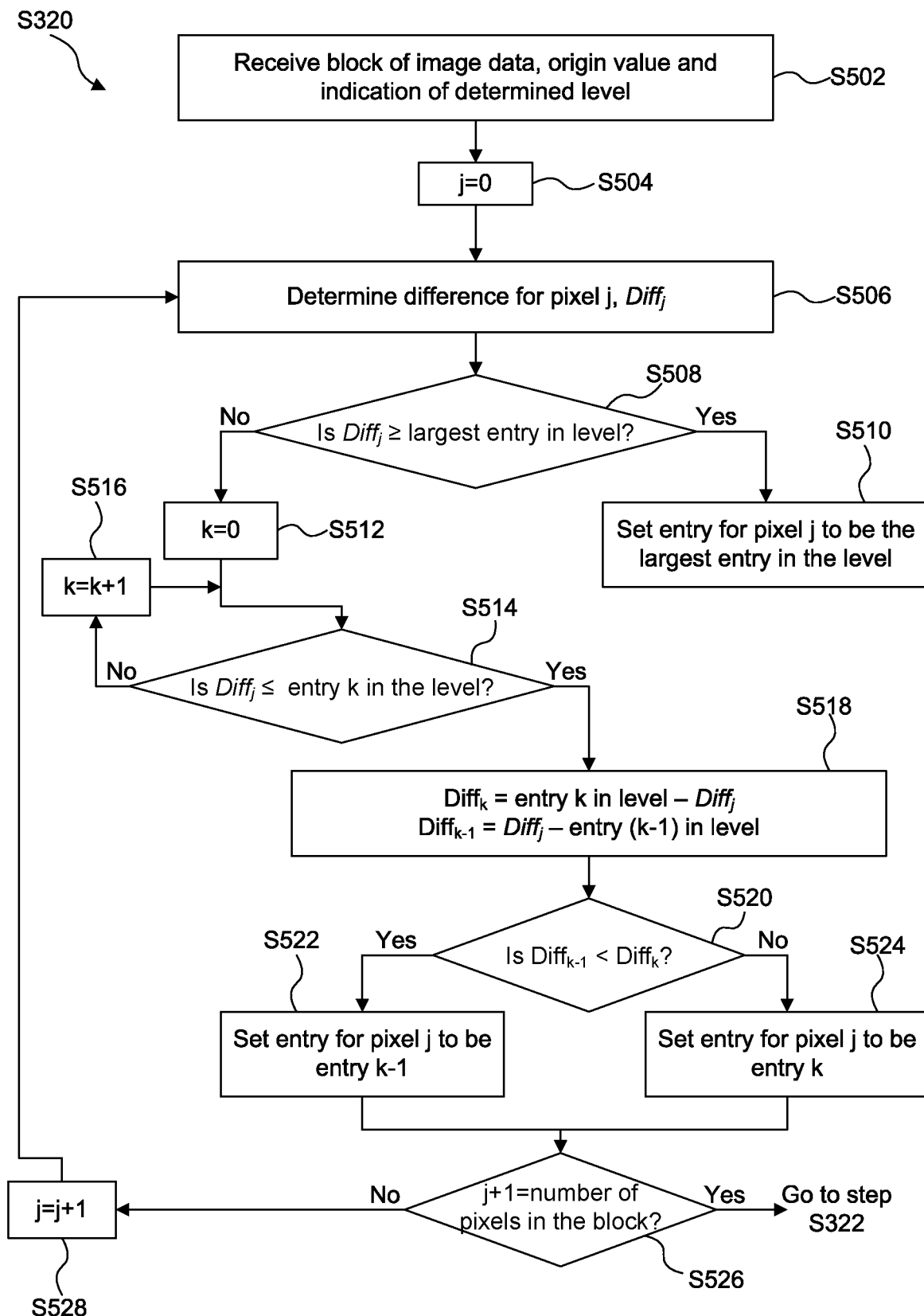
FIG. 5 is a flow chart for a method of selecting an entry at the determined level for each image element value within the block of image data.

FIG. 5 is a flow chart showing an example of how step S320 could be performed in the entry selection logic 308 to select an entry at the determined level for each pixel value 204 in the block of pixel data 202. According to the method shown in FIG. 5, in step S502, the entry selection logic 308 receives: (i) the block of pixel data 202, (ii) the origin value determined by the origin value determination logic 304, and (iii) an indication of the level (referred to herein as "$\text{level}_{set}$") determined by the level determination logic 306.

In step S504 the entry selection logic 308 sets a parameter, j, to be zero. In step S506, the entry selection logic 508 determines a difference for pixel j, $\text{Diff}_j$. This can be done by subtracting the origin value (i.e. the base value) from the $j^{th}$ pixel value ("$\text{pixelValue}_j$"). In other words, $\text{Diff}_j = \text{pixelValue}_j - \text{baseValue}$.

In step S508 the difference for pixel j, $\text{Diff}_j$, is compared to the largest entry in the determined level (i.e. $\text{level}_{set}$) of the multi-level difference table. In the example shown in Table 1, and in an example in which $\text{level}_{set}$ is level 2, the largest entry represents a value of 32. If $\text{Diff}_j$ is greater than or equal to the largest entry in $\text{level}_{set}$ of the multi-level difference table, then the method passes to step S510 in which the entry for pixel j is set to be the largest entry in $\text{level}_{set}$.

If $\text{Diff}_j$ is less than the largest entry in $\text{level}_{set}$ of the multi-level difference table, then the method passes to step S512 in which a parameter, k, is set to zero. Then in step S514 the entry selection logic 308 determines whether the difference for pixel j, $\text{Diff}_j$, is less than or equal to the kth entry in the determined level (i.e. $\text{level}_{set}$) of the multi-level difference table. As an example, in Table 1 shown above, entry 0 in level 2 represents a value of 0. If $\text{Diff}_j$ is not less than or equal to the kth entry in $\text{level}_{set}$ of the multi-level difference table then the method passes from step S514 to step S516 in which the parameter, k, is incremented and then the method passes back to step S514 to consider the next entry (e.g. entry 1 in this iteration) of $\text{level}_{set}$. In the example shown in Table 1 above, entry 1 in level 2 represents a value of 8. This loop of step S514 and step S516 continues until it is determined in step S514 that $\text{Diff}_j$ is less than or equal to the $k^{th}$ entry in $\text{level}_{set}$ of the multi-level difference table, and then the method passes to step S518.

In step S518, a difference ($\text{Diff}_k$) between the $k^{th}$ entry in $\text{level}_{set}$ and the difference for pixel j, $\text{Diff}_j$, is determined, and a difference ($\text{Diff}_{k-1}$) between the difference for pixel j, $\text{Diff}_j$, and the $(k-1)^{th}$ entry in $\text{level}_{set}$ is determined. In step S520, the entry selection logic 308 determines whether $\text{Diff}_{k-1} < \text{Diff}_k$. If $\text{Diff}_{k-1}$ is less than $\text{Diff}_k$ then the method passes to step S522 in which the entry for pixel j is set to be entry (k−1) of $\text{level}_{set}$. However, if $\text{Diff}_{k-1}$ is not less than $\text{Diff}_k$ then the method passes to step S524 in which the entry for pixel j is set to be entry k of $\text{level}_{set}$.

Therefore, steps S508 to S524 are an example of a way to implement a process of selecting, from the determined level of the multi-level difference table, the entry which most closely represents the determined difference value for the $j^{th}$ pixel, $\text{Diff}_j$.

In step S526 the entry selection logic 308 determines whether (j+1) equals the number of pixels 204 in the block of pixels 202. If (j+1) does not equal the number of pixels 204 in the block of pixel data 202, then this means that there are more pixel values in the block of pixel data 202 for which an entry is to be selected. Therefore, the method passes to step S528 in which the parameter, j, is incremented, and the method passes back to step S506 so that the next pixel value in the block of pixels can have an entry selected for it by the entry selection logic 308.

If it is determined in step S526 that (j+1) does equal the number of pixels 204 in the block of pixels 202, then this means that an entry has been selected for each of the pixel values in the block of pixel data 202. Therefore, step S320 has been completed and the method passes to step S322.

We will now carry on with the example given above in which the four pixel values 204 within the block of pixel data 202 are 8-bit values representing values of 52 (i.e. 00110100 in binary), 46 (i.e. 00101110 in binary), 60 (i.e. 00111100 in binary) and 66 (i.e. 01000010 in binary), and in which the base value is 40 (i.e. a binary value of 00101000), and in which the level determination logic 306 selects level 2 from the multi-level difference table for this block of pixel data. This base value can be stored by just storing the most significant five bits (00101), with the three least significant bits implicitly being zeroes, without needing to be stored. In this example, the differences for the four pixel values are 12, 6, 20 and 26. Therefore, it can be seen from Table 1 above, that the selected entries for these four pixel values will be entry 2 (representing a value of 16), entry 1 (representing a value of 8), entry 2 (representing a value of 16) and entry 3 (representing a value of 32) respectively.

Returning to FIG. 3*b*, following step S320, the method passes to step S322 in which the compressed block formation logic 310 forms a compressed block of data for the block of pixel data. The compressed block formation logic 310 receives: (i) data representing the determined origin value from the origin value determination logic 304, (ii) an indication of the determined level from the level determination logic 306, and (iii) an indication of the selected entry for each of the image element values (e.g. for each of the pixel values 204 in the block of pixel data 202) from the entry selection logic 308. The compressed block of data which is formed by the compressed block formation logic 310 comprises: (i) data representing the determined origin value for the block of pixel data 202, (ii) an indication of the determined level for the block of pixel data 202, and (iii) for each pixel value 204 in the block of pixel data 202, an indication of the selected entry for that pixel value 204.

In step S324 the compressed block of data is output from the compression unit 302. The compressed block of data may for example be stored in a memory, e.g. the memory 106.

Figure 6:
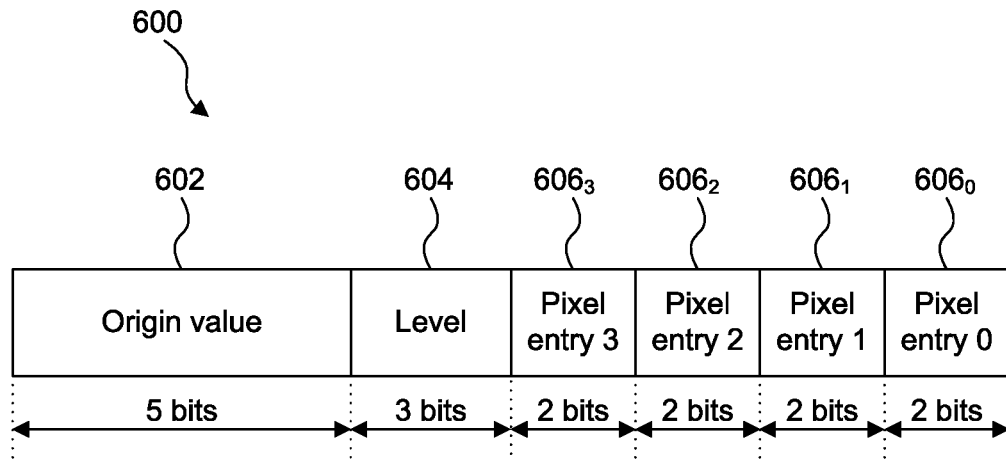
FIG. 6 illustrates an example format of a compressed block of data.

FIG. 6 shows an example of the format of a compressed block of data 600. The example shown in FIG. 6 relates to the example in which a block of pixel data 202 comprising four pixel values 204 is compressed, and in which each of the pixel values 204 has 8-bits. In this example, the uncompressed block of pixel data 202 is represented with 32 bits. In the example shown in FIG. 6, the compressed block of data has 16 bits, such that it achieves a compression ratio of 2:1. To put this another way, the number of bits used to represent the compressed block of data 600 is half of the number of bits used to represent the (uncompressed) block of image data, such that the lossy compression has a compression ratio of 2:1. This compression ratio is guaranteed. In other words, the number of bits used to represent the compressed block of data 600 does not depend upon the values of the pixel values 204 in the block of pixel data 202. The compressed block of data 600 comprises: (i) 5 bits of data representing the determined origin value 602, (ii) 3 bits for the indication of the determined level 604, and (iii) 2 bits for each of the four pixel values for the indication of the selected entry for that pixel value $606_0$, $606_1$, $606_2$ and $606_3$. It is noted that using 3 bits for the indication of the level allows up to eight different levels to be indicated in the multi-level difference table, and using 2 bits for each of the indications for the selected entries allows each level to have up to four entries. Therefore, the format of the compressed block of data 600 shown in FIG. 6 is suitable (i.e. compatible) for use with the multi-level difference table shown in Table 1 above.

In other examples, a different multi-level difference table may be used, and the compressed block of data may have a different format. The format of the compressed block of data and the number of levels in the multi-level difference table and the number of entries in each level of the multi-level difference table may be chosen together, e.g. so that the number of levels in the multi-level difference table (L) and the number of bits used to indicate the level (NO are related such that $2^{N_L}=L$, and so that the number of entries in each level of the multi-level difference table (E) and the number of bits used to indicate a selected entry for each pixel value (NE) are related such that $2^{N_E}=E$.

For example, in a different system if a 4×4 block of 8-bit pixel values are compressed (such that the uncompressed block of pixel data has 128 bits) then the compressed block of data may have 8 bits for the origin value, 8 bits for the indication of the level and 3 bits for each of the 16 pixel values to indicate a selected entry. Therefore, the compressed block of data would have 64 bits, and the compression ratio would be 2:1. In this example, the multi-level difference table could have up to 256 levels (because $2^8=256$), and each level could have 8 entries (because $2^3=8$).

In another different example, the target compression ratio could be 4:3, and a 2×2 block of 8-bit pixel values could be compressed such that the uncompressed block of pixel data would have 32 bits and the compressed block of data would have 24 bits. In this example, the compressed block of data may have 8 bits for the origin value, 4 bits for the indication of the level and 3 bits for each of the 4 pixel values to indicate a selected entry. In this example, the multi-level difference table could have up to 16 levels (because $2^4=16$), and each level could have 8 entries (because $2^3=8$).

It is noted that in both of the two alternative examples given above the origin value is represented with the same number of bits as one of the original pixel values, so it does not need to be rounded or "clamped" or "truncated" in these examples.

The examples described above relate to a compression unit 302 (e.g. configured in dedicated hardware (e.g. fixed-function circuitry)) which performs lossy compression to compress a block of image data to form a compressed block of data. We now go on to describe a decompression unit (e.g. configured in dedicated hardware (e.g. fixed-function circuitry)) which performs lossy decompression to decompress a compressed block of data to form a block of image data. The decompression unit performs a decompression technique which is complementary to the compression technique used to compress the data, such that the decompressed block of image data is similar to the original block of image data prior to compression (although the decompressed block of image data is not necessarily exactly the same as the original block of image data prior to compression because some data may be lost during the lossy compression and decompression). As a brief overview of the decompression process, a block of compressed data (e.g. for a 2×2 block of pixels) is read, thereby reading the data representing the origin value (e.g. the base value), the indication of the level in the multi-level difference table, and the indications of the selected entries for each of the image element values (e.g. pixel values). The decompressed pixel values can then be determined by adding the base value and the values represented by the respective entries from the multi-level difference table.

Figure 7:
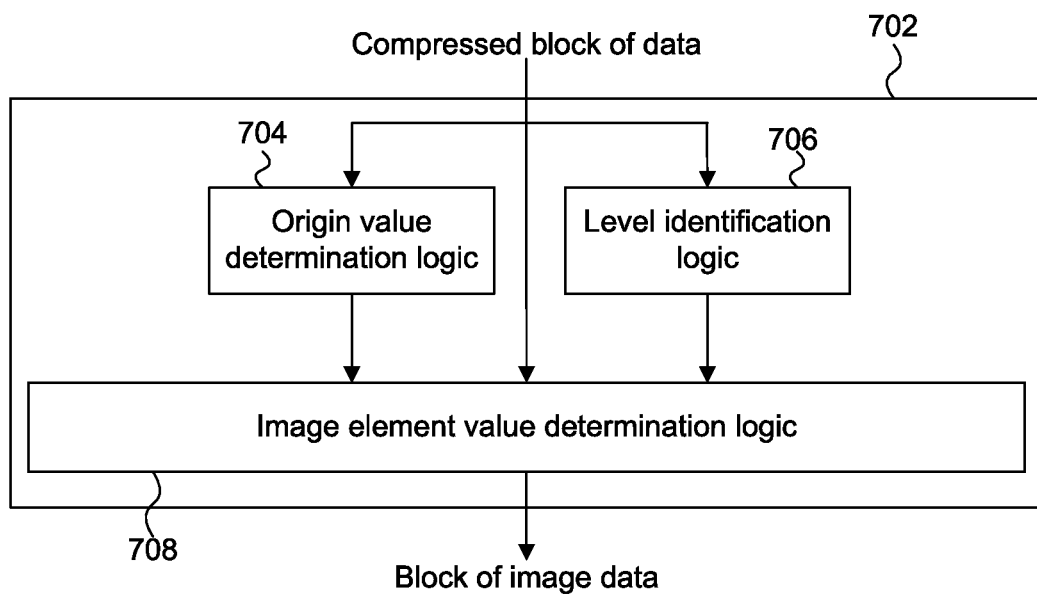
FIG. 7 shows a lossy decompression unit.

An example of a decompression technique is now described with reference to FIGS. 7 and 8. FIG. 7 shows a decompression unit 702 configured to perform lossy decompression on a compressed block of data in accordance with a multi-level difference table. The decompression unit 702 could be implemented as part of the compression/decompression unit 112 within the GPU 104. The decompression unit 702 is configured to receive the compressed block of data, perform decompression on the compressed block of data to form a block of (decompressed) image data, and output the block of image data, e.g. for further processing in the GPU 104. The decompression unit 702 comprises origin value determination logic 704, level identification logic 706 and image element value determination logic 708. The origin value determination logic 704, the level identification logic 706 and the image element value determination logic 708 may be implemented in dedicated hardware, e.g. in fixed-function circuitry.

Figure 8:
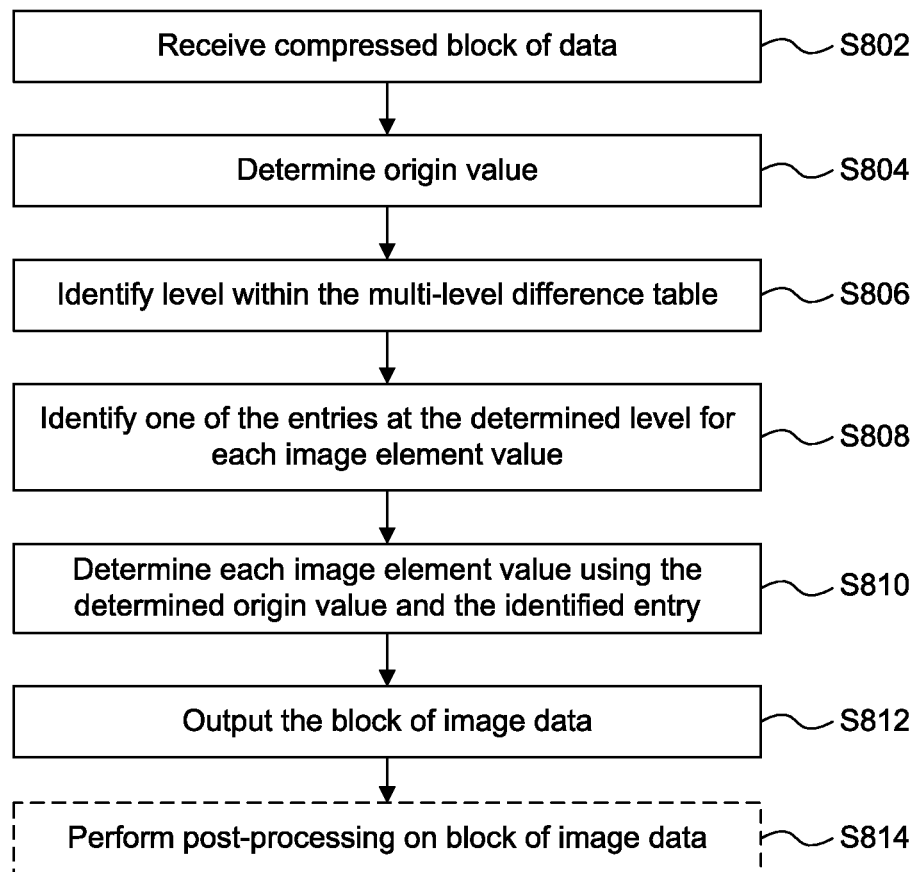
FIG. 8 is a flow chart for a method of decompressing a compressed block of data.

FIG. 8 is a flow chart for a method of decompressing a compressed block of data using the decompression unit 702. In step S802 a compressed block of data is received at the decompression unit 702. The compressed block of data is provided to the origin value determination logic 704, the level identification logic 706 and the image element value determination logic 708. The compressed block of data may have been compressed using one of the example compression techniques described above. In particular, in examples described herein, the compressed block of data 600 has the format shown in FIG. 6.

In step S804 the origin value determination logic 704 determines an origin value for the block of image data using the data representing the origin value from the compressed block of data. This may, for example involve appending one or more bits (e.g. zeroes) to the data representing the origin value 602 in the compressed block of data. For example, if the (uncompressed) pixel values have 8 bits, and if there are 5 bits 602 representing the origin value in the compressed block of data 600, then step S804 can comprise appending three zeroes to the least significant end of the 5 bits 602 representing the origin value in the compressed block of data 600. As described above, in some other examples, the data representing the origin value in the compressed block of data may have the same number of bits as one of the image element values, in which case step S804 would just involve reading those bits from the compressed block of data (i.e. no further bits would need to be appended to the data representing the origin value in these other examples).

In step S806 the level identification logic 706 identifies a level within the multi-level difference table for the block of image data using the indication 604 of the level from the compressed block of data 600. For example, the indication of the level 604 comprises three bits which can act as an index to indicate one of eight levels within the multi-level difference table, e.g. as shown in Table 1 above. As described above, a size of a range of values represented by the entries in a level is different for different levels of the multi-level difference table.

The image element value determination logic 708 receives an indication of the level identified by the level identification logic 706, and the origin value determined by the origin value determination logic 704. In step S808 the image element value determination logic 708 uses a respective entry indication 606 from the compressed block of data 600 to identify, for each of the pixel values in the block of pixel data, one of the entries at the identified level within the multi-level difference table.

In step S810 the image element value determination logic 710 determines each of the pixel values using the determined origin value for the block of pixel data and the identified entry at the identified level within the multi-level difference table for the pixel value. For example, step S810 may comprise summing the determined origin value for the block of pixel data and a value represented by the identified entry at the identified level within the multi-level difference table for a pixel value. If the result of the sum is greater than a maximum possible pixel value, then the pixel value is set to be the maximum possible pixel value. For example, if the pixel values have 8 bits then 255 (which is represented in binary as 11111111) is the maximum possible pixel value, so if the result of a sum for determining a pixel value is greater than 255, then that pixel value is set to be 255. If the pixel values have a different number of bits then the maximum possible pixel value will be different.

Similarly to as mentioned above with reference to the compression unit 302, the multi-level difference table could be stored in a memory within the decompression unit 702, wherein the level identification logic 706 and the image element value determination logic 708 can perform lookups to the memory to access the multi-level difference table; or the multi-level difference table could be hardcoded into the circuitry of the level identification logic 706 and the image element value determination logic 708.

In step S812, the (decompressed) block of pixel data is outputted from the decompression unit 702, e.g. for further processing in the GPU 104. As described in more detail below, post-processing may be performed on the block of image data in step S814. This step is shown in FIG. 8 with a dashed line because this step is optional.

The decompression process is very simple to implement, and may for example include performing an addition operation (or a subtraction operation in some examples), but might not involve performing complex operations such as multiplication or division or any buffering of internal values during decompression. As described above, the pixel values may be in an integer format (rather than a more complicated format, such as a floating point format).

In the examples described above, the origin value is a base value (i.e. representing a minimum pixel value within a block of pixel data) and the differences represented by the entries in the multi-level difference table represent additions to be made to the base value to thereby represent the pixel values within the block of pixel data. However, in other examples, the origin value could be a top value (i.e. representing a maximum pixel value within a block of pixel data) and the differences represented by the entries in the multi-level difference table could represent subtractions to be made from the top value to thereby represent the pixel values within the block of pixel data. In yet further examples, the origin value could be some middle value (e.g. representing a mid-point between the maximum and minimum pixel values within a block of pixel data) and the differences represented by the entries in the multi-level difference table could be in a signed format such that they can represent additions or subtractions to be made with respect to the middle value to thereby represent the pixel values within the block of pixel data.

As described above, examples are described in detail herein with reference to a block of pixel data comprising pixel values, but more generally the decompression process can be performed on a block of image data comprising image element values, wherein image element values may be pixel values, texel values, depth values, surface normal values or lighting values to give some examples.

As mentioned above, in some examples there may be some pre-processing (in step S312) and some post-processing (in step S814) performed on the block of image data. For example, the block of image data could relate to one channel of a block of multi-channel image data, wherein different channels of the multi-channel image data can be compressed and decompressed independently. For example, the block of multi-channel image data may be colour data for a block of colour values, comprising: (i) a first block of image data relating to a red channel of the block of colour values, (ii) a second block of image data relating to a green channel of the block of colour values, and (iii) a third block of image data relating to a blue channel of the block of colour values. Before the three blocks of image data are compressed independently, colour decorrelation may be performed on the colour values in step S312.

Errors of colour values may occur in images which have been compressed using a lossy compression technique and then decompressed. The errors introduced by lossy compression may stretch the colour channel values further apart. Furthermore, in a situation in which the red, green and blue colour channels are highly correlated (e.g. to represent a grey colour) errors which vary between the different colour channels may be more perceptible to a viewer. For example, the lossy compression can introduce noticeable colours into regions of an image which are supposed to be grey. Applying colour decorrelation to the channels before the (independent) lossy compression of each of the separate channels can help to reduce the colour distortion introduced into the image (e.g. into the grey regions of the image).

A simple colour decorrelation technique can be used when the multi-channel image data is in an RGB format such that each colour value comprises a red value (R), a green value (G) and a blue value (B). The colour decorrelation process (e.g. step S312) can comprise:

calculating the image element values (R') of a first block of image data in accordance with the equation R'=R-G;

determining the image element values (G') of a second block of image data in accordance with the equation G'=G; and calculating the image element values (B') of a third block of image data in accordance with the equation B'=B-G.

The first, second and third blocks of image data (with the values R', G' and B') can then be compressed independently as described above.

When the data is decompressed, the post-processing step S814 can perform colour recorrelation on the colour values after the compressed blocks of data relating to the three blocks of image data have been decompressed independently, as described above. For example, the colour recorrelation process (e.g. step S814) can comprise:

calculating the red values (R) using the image element values (R') which have been decompressed from the first compressed block of data and using the image element values (G') which have been decompressed from the second compressed block of data in accordance with the equation R=R'+G';

determining the green values (G) using the image element values (G') which have been decompressed from the second compressed block of data in accordance with the equation G=G'; and calculating the blue values (B) using the image element values (B') which have been decompressed from the third compressed block of data and using the image element values (G') which have been decompressed from the second compressed block of data in accordance with the equation B=B'+G'.

In other examples, rather than performing colour decorrelation and colour recorrelation in the pre-processing and post-processing steps (step S312 and S814), these pre-processing and post-processing steps could involve converting the multi-channel values into a different colour space. For example, if the multi-channel image data is colour data in an RGB format such that each colour value comprises a red value (R), a green value (G) and a blue value (B), then step S312 may comprise converting the colour data to a luma-chroma format, e.g. which comprises: (i) a first block of image data relating to a luma channel (Y) for a block of colour values, (ii) a second block of image data relating to a first chroma channel (Cb) for the block of colour values, and (iii) a third block of image data relating to a second chroma channel (Cr) for the block of colour values. After the colour data has been converted to the luma-chroma format, the three blocks of image data can be compressed independently as described above. Converting the colour data into a YCbCr colour space before the lossy compression can help to reduce the colour distortion in the image (e.g. in grey areas of the image).

Methods for converting from an RGB format to a YCbCr format are known in the art, and may be implemented according to the following equations:

$$Y = 0 + 0.299R + 0.587G + 0.114B$$

$$Cb = 128 - 0.168736R - 0.331264G + 0.5B$$

$$Cr = 128 + 0.5R - 0.418688G - 0.081312B$$

When the data is decompressed, the post-processing step S814 can convert the colour data from the YCbCr format back into the RGB format after the compressed blocks of data relating to the three blocks of image data have been decompressed independently, as described above. For example, three blocks of compressed data are decompressed independently to determine multi-channel colour data in a luma-chroma format comprising: (i) a first block of image data relating to a luma channel (Y), (ii) a second block of image data relating to a first chroma channel (Cb), and (iii) a third block of image data relating to a second chroma channel (Cr), and step S814 can comprise converting the colour data into an RGB format such that each colour value comprises a red value (R), a green value (G) and a blue value (B).

Methods for converting from a YCbCr format to a RGB format are known in the art, and may be implemented according to the following equations:

$$R = Y + 1.402*(Cr - 128)$$

$$G = Y - 0.344136*(Cb - 128) - 0.714136*(Cr - 128)$$

$$B = Y + 1.772*(Cb - 128)$$

In the examples described above, a lossy compression technique is implemented on its own to perform lossy compression on blocks of image data to thereby guarantee a particular target compression ratio (e.g. 2:1). However, in some situations a lossless compression technique might have been able to satisfy the target compression ratio for at least some of the blocks of image data, and the lossless compression technique would not introduce errors into the image data. Therefore, in some situations it can be useful to perform lossless compression on a block of image data if this will satisfy the target compression ratio, but if the lossless compression of the block of image data will not satisfy the target compression ratio then the block of image data can be compressed using a lossy compression technique (e.g. one of the lossy compression techniques described herein). This can be described as using lossy compression as a "fallback" to lossless compression. This achieves the guaranteed compression ratio, and reduces the errors introduced by the compression compared to using only lossy compression. However, in order to implement this "fallback" compression technique, the compression unit needs to be capable of performing both lossless and lossy compression, so the physical size (e.g. silicon area) of the compression unit may be greater than examples in which only lossy compression is implemented. However, this increase in physical size is likely to be small, and in some situations this can be considered acceptable in order to achieve the reduction in errors that can be provided by using this fallback compression technique compared to using solely lossy compression.

Figure 9:
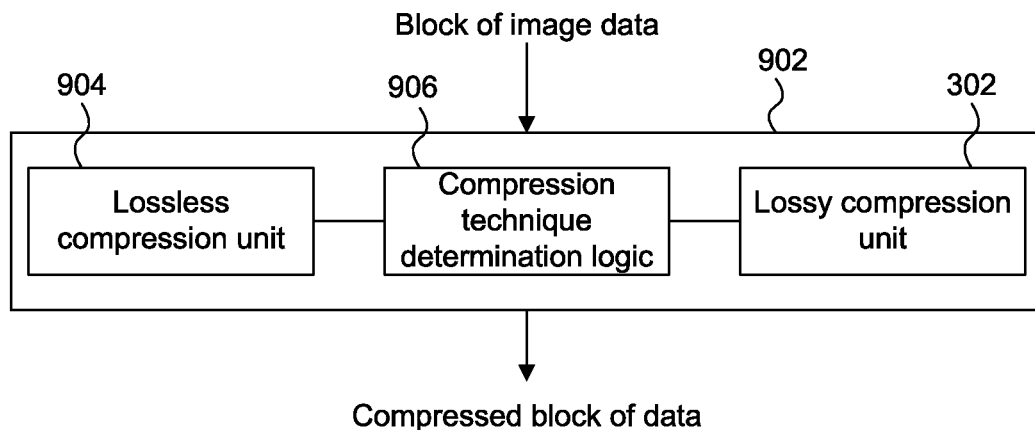
FIG. 9 shows a compression unit comprising a lossless compression unit and a lossy compression unit.

FIG. 9 shows a compression unit 902 which comprises a first compression unit 904 which is configured to perform lossless compression on a block of image data, a second compression unit (which in this example is the lossy compression unit 302 described above) which is configured to perform lossy compression on a block of image data, and compression technique determination logic 906. The compression units 904 and 302 and the compression technique determination logic 906 may be implemented in dedicated hardware, e.g. in fixed-function circuitry.

Figure 10:
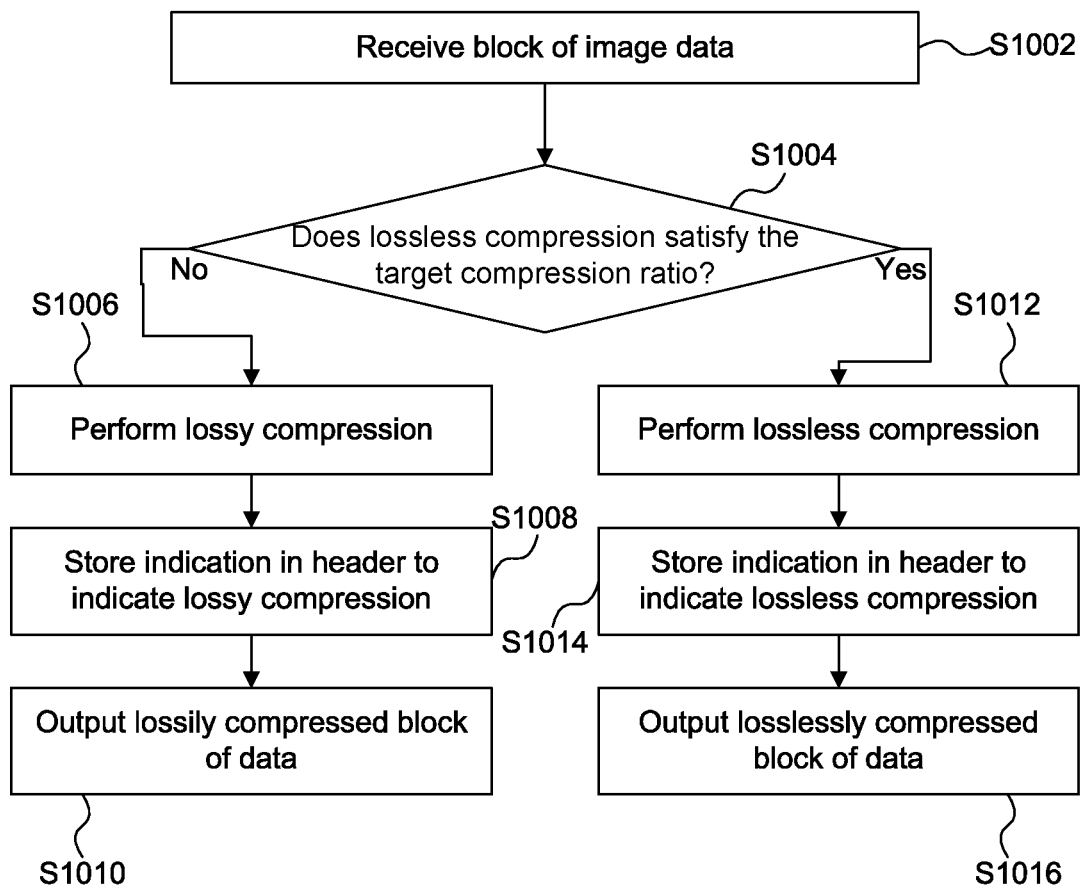
FIG. 10 is a flow chart for a method compressing a block of image data using the compression unit of FIG. 9.

FIG. 10 is a flow chart for a method of compressing a block of image data using the compression unit 902. In step S1002 the compression unit 902 receives a block of image data to be compressed.

In step S1004 the compression technique determination logic 906 determines whether a lossless compression of the block of image data will satisfy a target compression ratio for the block of image data. For example, the compression technique determination logic 906 may determine whether a lossless compression of the block of image data will satisfy a target compression ratio for the block of image data by predicting an amount of compressed data that would result from performing the lossless compression on the block of image data, and then determining whether the predicted amount of compressed data would satisfy the target compression ratio. The prediction of the amount of compressed data that would result from performing the lossless compression on the block of image data may be performed, in this example, without completing the lossless compression on the block of image data. For example, some or none of the operations involved in performing the lossless compression may be performed in order to predict the amount of compressed data that would result from performing the lossless compression on the block of image data.

If it is determined in step S1004 that the lossless compression of the block of image data will not satisfy the target compression ratio, then the method passes to step S1006 in which lossy compression is performed on the block of image data by the lossy compression unit 302 to form a compressed block of data. For example, the lossy compression performed by the lossy compression unit 302 may be as described in the examples given above. The compression ratio of the lossy compression performed by the lossy compression unit 302 is guaranteed to satisfy the target compression ratio for the block of image data.

In step S1008 the lossy compression unit 302 stores an indication in a header associated with the compressed block of data to indicate that the block has been compressed with the lossy compression technique. In step S1010 the lossily compressed block of data is outputted from the compression unit 902, e.g. for storage in a memory.

If it is determined in step S1004 that the lossless compression of the block of image data will satisfy the target compression ratio, then the method passes to step S1012 in which lossless compression is performed on the block of image data by the lossless compression unit 904 to form a compressed block of data. Methods of performing lossless compression on a block of image data are known in the art.

In step S1014 the lossless compression unit 904 stores an indication in a header associated with the compressed block of data to indicate that the block has been compressed with a lossless compression technique. In step S1016 the losslessly compressed block of data is outputted from the compression unit 902, e.g. for storage in a memory.

In other examples, the step of determining whether the lossless compression of the block of image data will satisfy a target compression ratio for the block of image data may comprise performing the lossless compression on the block of image data and determining whether the amount of compressed data resulting from performing the lossless compression on the block of image data satisfies the target compression ratio. This may be simpler to implement than trying to predict the amount of data that will result from the lossless compression without fully performing the lossless compression, but it may involve performing more operations than are necessary, such that the power consumption and latency may be increased.

In some examples, the block of image data is one of a plurality of blocks of image data representing an image, and there is a total image target compression ratio which relates to the whole image. Since the compression ratio achieved by the lossless compression will depend upon the image data being compressed, some of the blocks of image data may be compressed losslessly with a compression ratio that exceeds the target compression ratio for that particular block of image data. This may create a surplus of data which could be used for representing other compressed blocks of data relating to the same image. Therefore, the target compression ratio for a block of image data may be modified (e.g. reduced) in dependence on the amount of compressed data that has been formed for other blocks of image data relating to the same image, such that the total image target compression ratio is satisfied. For example, if previous blocks of image data relating to an image have been compressed losslessly achieving a greater compression ratio than the target compression ratio for a block, then the target compression ratio for a subsequent block of image data to be compressed relating to the same image may be decreased, whilst still satisfying the total image target compression ratio. This may allow a greater number of the blocks of image data for the image to be compressed losslessly (and therefore a lower number of the blocks of image data for the image to be compressed lossily), which can therefore reduce the number of errors introduced into the image due to the lossy compression process. In other words, the reduction in image quality due to the lossy compression can be lessened by allowing a target compression ratio for a block of image data relating to an image to be modified (e.g. reduced) when another block of image data relating to the same image is losslessly compressed with a greater compression ratio than is required by the target compression ratio for the blocks of image data.

Figure 11:
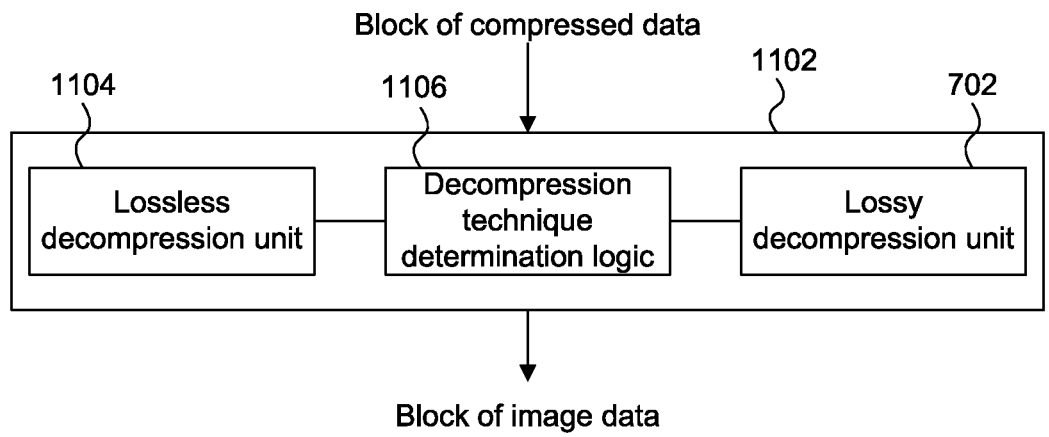
FIG. 11 shows a decompression unit comprising a lossless decompression unit and a lossy decompression unit.

FIG. 11 shows a decompression unit 1102 which comprises a first decompression unit 1104 which is configured to perform lossless decompression on a compressed block of data, a second decompression unit (which in this example is the lossy decompression unit 702 described above) which is configured to perform lossy decompression on a compressed block of data, and decompression technique determination logic 1106. The decompression units 1104 and 702 and the decompression technique determination logic 1106 may be implemented in dedicated hardware, e.g. in fixed-function circuitry.

Figure 12:
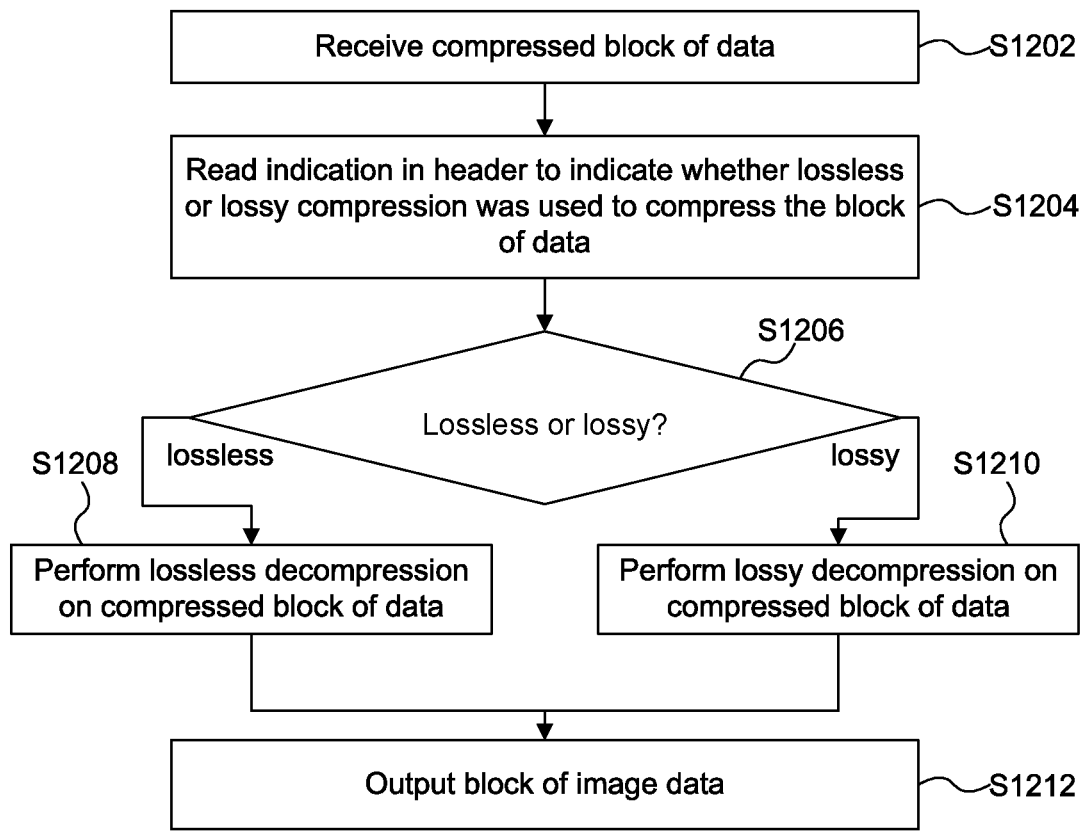
FIG. 12 is a flow chart for a method decompressing a compressed block of data using the decompression unit of FIG. 11.

FIG. 12 is a flow chart for a method of decompressing a compressed block of data using the decompression unit 1102. In step S1202 the decompression unit 1102 receives a compressed block of data to be decompressed. The compressed block of data has been compressed using the compression unit 902 described above.

In step S1204 the decompression technique determination logic 1106 reads the indication in the header associated with the compressed block of data which indicates whether the compressed block of data has been compressed with a lossless compression technique or with a lossy compression technique. In step S1206 the decompression technique determination logic 1106 uses the indication that it has read from the header associated with the compressed block of data to determine whether the compressed block of data has been compressed with the lossless compression technique or with the lossy compression technique.

If, in step S1206, it is determined that the compressed block of data has been compressed with the lossless compression technique, then the method passes to step S1208 in which the lossless decompression unit 1104 performs a lossless decompression technique on the compressed block of data to thereby decompress the compressed block of data. The decompression technique used by the lossless decompression unit 1104 is complementary to the lossless compression technique used by the lossless compression unit 904, so that the lossless decompression unit 1104 can correctly decompress data which has been compressed by the compression unit 904. Methods for performing lossless decompression are known in the art. Following step S1208 the method passes to step S1212.

If, in step S1206, it is determined that the compressed block of data has been compressed with the lossy compression technique, then the method passes to step S1210 in which the lossy decompression unit 702 performs a lossy decompression technique on the compressed block of data to thereby decompress the compressed block of data. The lossy decompression can be performed as described in the examples given above.

Following step S1210 the method passes to step S1212. In step S1212 the decompressed block of image data is outputted from the decompression unit 1102, e.g. for further processing in the GPU 104.

In this "fallback" system, lossless compression is used to compress a block of image data when it meets a target compression ratio and lossy compression is used to compress the block of image data if the lossless compression would not meet the target compression ratio (to thereby guarantee that the compression ratio is achieved). When an image comprises a plurality of blocks of image data, some of the blocks of image data in the image may be compressed losslessly whilst some other blocks of image data in the image may be compressed lossily. The size of the blocks of image data could be any suitable size, e.g. 2×2 blocks of image data as described above or some other size and/or shape of block of image data.

The compression units and decompression units are described herein as comprising a number of functional blocks. This is schematic only and is not intended to define a strict division between different logic elements of such entities. Each functional block may be provided in any suitable manner. It is to be understood that intermediate values described herein as being formed by a compression unit or a decompression unit need not be physically generated by the compression unit or the decompression unit at any point and may merely represent logical values which conveniently describe the processing performed by the compression unit or the decompression unit between its input and output.

The compression units and decompression units described herein may be embodied in hardware on an integrated circuit. The compression units and decompression units described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a compression unit and/or a decompression unit configured to perform any of the methods described herein, or to manufacture a compression unit and/or a decompression unit comprising any apparatus described herein. An integrated circuit definition dataset may be, for example, an integrated circuit description.

Therefore, there may be provided a method of manufacturing, at an integrated circuit manufacturing system, a compression unit and/or a decompression unit as described herein.

Furthermore, there may be provided an integrated circuit definition dataset that, when processed in an integrated circuit manufacturing system, causes the method of manufacturing a compression unit and/or a decompression unit to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a compression unit and/or a decompression unit will now be described with respect to FIG. 13.

Figure 13:
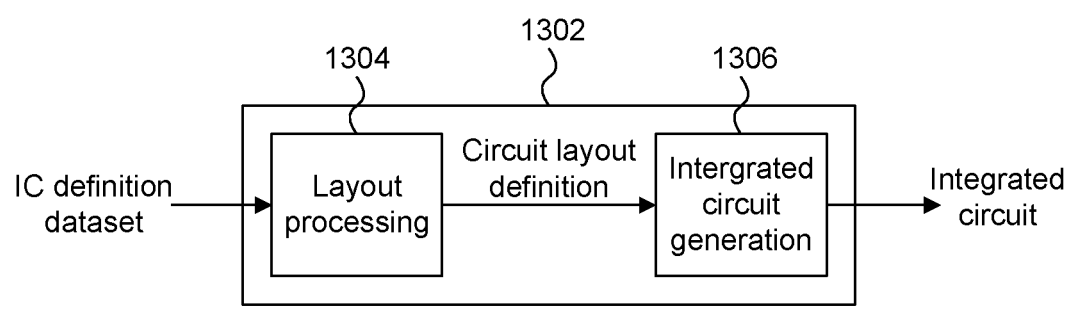
FIG. 13 shows an integrated circuit manufacturing system for generating an integrated circuit embodying a compression unit or a decompression unit as described herein.

FIG. 13 shows an example of an integrated circuit (IC) manufacturing system 1302 which is configured to manufacture a compression unit and/or a decompression unit as described in any of the examples herein. In particular, the IC manufacturing system 1302 comprises a layout processing system 1304 and an integrated circuit generation system 1306. The IC manufacturing system 1302 is configured to receive an IC definition dataset (e.g. defining a compression unit and/or a decompression unit as described in any of the examples herein), process the IC definition dataset, and generate an IC according to the IC definition dataset (e.g.

which embodies a compression unit and/or a decompression unit as described in any of the examples herein). The processing of the IC definition dataset configures the IC manufacturing system 1302 to manufacture an integrated circuit embodying a compression unit and/or a decompression unit as described in any of the examples herein.

The layout processing system 1304 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1304 has determined the circuit layout it may output a circuit layout definition to the IC generation system 1306. A circuit layout definition may be, for example, a circuit layout description.

The IC generation system 1306 generates an IC according to the circuit layout definition, as is known in the art. For example, the IC generation system 1306 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1306 may be in the form of computer-readable code which the IC generation system 1306 can use to form a suitable mask for use in generating an IC.

The different processes performed by the IC manufacturing system 1302 may be implemented all in one location, e.g. by one party. Alternatively, the IC manufacturing system 1302 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a compression unit and/or a decompression unit without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 13 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 13, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A computer-implemented method of performing lossy compression on a plurality of blocks of image data in accordance with a multi-level difference table, wherein the blocks of image data relate to respective channels of multi-channel image data, wherein each block of image data comprises a plurality of image element values, and wherein each level of the multi-level difference table comprises a plurality of entries, the method comprising compressing the block of image data for each of the different channels of the multi-channel image data independently by:
   determining an origin value for the block of image data;
   determining a level within the multi-level difference table for the block of image data;
   for each image element value in the block of image data, selecting one of the entries at the determined level within the multi-level difference table; and
   forming a compressed block of data for the block of image data, the compressed block of data comprising: (i) data representing the determined origin value, (ii) an indication of the determined level, and (iii) for each image element value in the block of image data, an indication of the selected entry for that image element value;
wherein said determining a level within the multi-level difference table for the block of image data comprises:
determining a maximum difference between the determined origin value and any one of the image element values in the block of image data, and
selecting, from the multi-difference table, the level whose largest entry most closely represents the determined maximum difference.

2. The method of claim 1, wherein a size of a range of values represented by the entries in a level is different for different levels of the multi-level difference table.

3. The method of claim 1, wherein said determining an origin value for the block of image data comprises identifying a minimum image element value in the block of image data.

4. The method of claim 1, wherein the data representing the determined origin value has fewer bits than any one of the image element values in the block of image data.

5. The method of claim 1, wherein said selecting one of the entries at the determined level within the multi-level difference table, for each of the image element values in the block of image data, comprises:
determining a difference value for the image element value by determining a difference between the determined origin value and the image element value; and
selecting, from the determined level of the multi-level difference table, the entry which most closely represents the determined difference value.

6. The method of claim 1, wherein the first entry in each level of the multi-level difference table represents a value of zero.

7. The method of claim 1, wherein the number of bits used to represent the compressed block of data does not depend upon the values of the image element values in the block of image data, such that a compression ratio of the lossy compression is guaranteed.

8. The method of claim 1, wherein the image element values are in an integer format, and wherein the block of image data is compressed by performing operations including one or more of addition operations, subtraction operations and compare operations on the image element values in the integer format, but the method of compressing the block of image data does not involve performing any multiplication operations or division operations.

9. The method of claim 1, wherein the block of multi-channel image data is colour data for a block of colour values, comprising: (i) a first block of image data relating to a red channel of the block of colour values, (ii) a second block of image data relating to a green channel of the block of colour values, and (iii) a third block of image data relating to a blue channel of the block of colour values, and wherein before the three blocks of image data are compressed independently, colour decorrelation is performed on the colour values.

10. The method of claim 1, wherein the multi-channel image data is colour data in an RGB format such that each colour value comprises a red value (R), a green value (G) and a blue value (B), and the method comprises converting the colour data to a luma-chroma format which comprises: (i) a first block of image data relating to a luma channel (Y) for a block of colour values, (ii) a second block of image data relating to a first chroma channel (Cb) for the block of colour values, and (iii) a third block of image data relating to a second chroma channel (Cr) for the block of colour values,
wherein after the colour data has been converted to the luma-chroma format, the three blocks of image data are compressed independently.

11. A method of compressing a block of image data, comprising:
determining whether a lossless compression of the block of image data will satisfy a target compression ratio for the block of image data; and
in response to determining that the lossless compression of the block of image data will not satisfy the target compression ratio, performing the lossy compression method of claim 1 on the block of image data, wherein a compression ratio of the lossy compression is guaranteed to satisfy the target compression ratio for the block of image data.

12. The method of claim 11, wherein said determining whether a lossless compression of the block of image data will satisfy a target compression ratio for the block of image data comprises:
predicting an amount of compressed data that would result from performing said lossless compression on the block of image data; and
determining whether said predicted amount of compressed data would satisfy the target compression ratio.

13. The method of claim 11, wherein said determining whether a lossless compression of the block of image data will satisfy a target compression ratio for the block of image data comprises:
performing the lossless compression on the block of image data; and
determining whether the amount of compressed data resulting from performing said lossless compression on the block of image data satisfies the target compression ratio.

14. The method of claim 11, wherein the block of image data is one of a plurality of blocks of image data representing an image, wherein there is a total image target compression ratio which relates to the whole image, and wherein the method comprises modifying the target compression ratio for the block of image data in dependence on the amount of compressed data that has been formed for other blocks of image data relating to the same image, such that the total image target compression ratio is satisfied.

15. A compression unit configured to perform lossy compression on a plurality of blocks of image data in accordance with a multi-level difference table, wherein the blocks of image data relate to respective channels of multi-channel image data, wherein each block of image data comprises a plurality of image element values, and wherein each level of the multi-level difference table comprises a plurality of entries, the compression unit being configured to compress the block of image data for each of the different channels of the multi-channel image data independently by:
origin value determination logic determining an origin value for the block of image data;
level determination logic determining a level within the multi-level difference table for the block of image data;
entry selection logic selecting, for each image element value in the block of image data, one of the entries at the determined level within the multi-level difference table; and
compressed block formation logic forming a compressed block of data for the block of image data, the compressed block of data comprising: (i) data representing the determined origin value, (ii) an indication of the determined level, and (iii) for each image element value in the block of image data, an indication of the selected entry for that image element value;

wherein said determining a level within the multi-level difference table for the block of image data comprises:
determining a maximum difference between the determined origin value and any one of the image element values in the block of image data; and
selecting, from the multi-level difference table, the level whose largest entry most closely represents the determined maximum difference.

16. A compression unit configured to compress a block of image data, the compression unit comprising:
a first compression unit configured to perform lossless compression on a block of image data;
a second compression unit according to claim 15 configured to perform lossy compression on a block of image data; and
compression technique determination logic configured to determine whether a lossless compression of the block of image data performed by the first compression unit will satisfy a target compression ratio for the block of image data,
wherein the compression technique determination logic is configured to, if it determines that the lossless compression of the block of image data will not satisfy the target compression ratio, cause the second compression unit to perform lossy compression on the block of image data, wherein a compression ratio of the lossy compression is guaranteed to satisfy the target compression ratio for the block of image data.

17. A non-transitory computer readable storage medium having stored thereon a computer readable dataset description of a compression unit that, when processed in an integrated circuit manufacturing system, causes the integrated circuit manufacturing system to manufacture an integrated circuit embodying the compression unit, wherein the compression unit is configured to perform lossy compression on a plurality of blocks of image data in accordance with a multi-level difference table, wherein the blocks of image data relate to respective channels of multi-channel image data, wherein each block of image data comprises a plurality of image element values, and wherein each level of the multi-level difference table comprises a plurality of entries, the compression unit being configured to compress the block of image data for each of the different channels of the multi-channel image data independently by:
origin value determination logic determining an origin value for the block of image data;
level determination logic determining a level within the multi-level difference table for the block of image data;
entry selection logic selecting, for each image element value in the block of image data, one of the entries at the determined level within the multi-level difference table; and
compressed block formation logic forming a compressed block of data for the block of image data, the compressed block of data comprising: (i) data representing the determined origin value, (ii) an indication of the determined level, and (iii) for each image element value in the block of image data, an indication of the selected entry for that image element value;
wherein said determining a level within the multi-level difference table for the block of image data comprises:
determining a maximum difference between the determined origin value and any one of the image element values in the block of image data, and
selecting, from the multi-level difference table, the level whose largest entry most closely represents the determined maximum difference.

18. The method of claim 1 wherein the multi-level difference table is predetermined.

* * * * *